United States Patent
Motoyoshi et al.

(10) Patent No.: US 9,472,805 B2
(45) Date of Patent: Oct. 18, 2016

(54) ALKALI METAL SILICATE, ALKALI TRANSITION METAL SILICATE, AND METHOD FOR SYNTHESIZING SILICATE

(75) Inventors: Mako Motoyoshi, Kanagawa (JP); Takahiro Kawakami, Kanagawa (JP); Masaki Yamakaji, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 374 days.

(21) Appl. No.: 13/595,000

(22) Filed: Aug. 27, 2012

(65) Prior Publication Data
US 2013/0059208 A1    Mar. 7, 2013

(30) Foreign Application Priority Data

Sep. 1, 2011  (JP) ................................ 2011-190670
Sep. 1, 2011  (JP) ................................ 2011-190678

(51) Int. Cl.
*H01M 4/58*   (2010.01)
*C01B 33/32*  (2006.01)

(52) U.S. Cl.
CPC ............ *H01M 4/5825* (2013.01); *C01B 33/32* (2013.01); *C01P 2002/72* (2013.01); *C01P 2004/03* (2013.01); *C01P 2006/12* (2013.01)

(58) Field of Classification Search
CPC ............ Y02E 60/122; H01M 10/052; B41C 2210/06; C07C 67/04; C07C 2521/06; B41N 3/034; B41N 3/03; G03F 7/322
USPC ................ 429/231.9; 423/333; 428/219
See application file for complete search history.

(56) References Cited

U.S. PATENT DOCUMENTS 4,443,496 A *  4/1984  Obitsu et al. ............... 427/140
2004/0234856 A1  11/2004  Morigaki et al.
(Continued)

FOREIGN PATENT DOCUMENTS

GB     1198313      7/1970
JP   2000-313615   11/2000
(Continued)

OTHER PUBLICATIONS

Wang.S, "Experiment 27—Preparation and stability of a sol", Combination Experiments in Physical Chemistry, Jun. 1, 2011, p. 111, Science Press.
(Continued)

*Primary Examiner* — Cynthia H Kelly
*Assistant Examiner* — Monique Wills
(74) *Attorney, Agent, or Firm* — Nixon Peabody LLP; Jeffrey L. Costellia

(57) ABSTRACT

A method for synthesizing alkali metal silicate which can be easily microparticulated, a method for synthesizing, with the use of the alkali metal silicate, alkali transition metal silicate, and alkali metal silicate and alkali transition metal silicate which are synthesized by the synthesis methods are disclosed. The alkali metal silicate is synthesized by the following steps: forming a basic solution including an alkali metal salt; mixing the basic solution including the alkali metal salt with silicon particles to form a basic solution including the alkali metal silicate; and adding the basic solution including the alkali metal silicate to a poor solvent for the alkali metal silicate to precipitate the alkali metal silicate. Further, the alkali metal silicate is mixed with a microparticulated compound including a transition metal to form a mixture, and the mixture is subjected to heat treatment, whereby the alkali transition metal silicate is generated.

27 Claims, 14 Drawing Sheets

(56) References Cited

U.S. PATENT DOCUMENTS

| | | | |
|---|---|---|---|
| 2006/0147367 A1* | 7/2006 | Temperly et al. | 423/331 |
| 2009/0233107 A1* | 9/2009 | Yamada et al. | 428/446 |
| 2010/0140540 A1 | 6/2010 | Yamada et al. | |
| 2011/0269022 A1 | 11/2011 | Kawakami et al. | |

FOREIGN PATENT DOCUMENTS

| | | |
|---|---|---|
| JP | 2002-265817 | 9/2002 |
| JP | 2007-335325 | 12/2007 |
| JP | 2009-104794 | 5/2009 |

OTHER PUBLICATIONS

Liu.W et al., "Effects of Synthesis Conditions on Performance of Li2MnSiO4 as Chathode Material", Chinese Journal of Power Sources, Apr. 30, 2010, vol. 34, No. 4, pp. 360-362.

Dominko.R et al "Li2MnSi04 as a potential Li-battery cathode material", Journal of Power Sources, Jun. 30, 2007, vol. 174, pp. 457-461, Elsevier.

Chinese Office Action (Application No. 201210320609.8) Dated May 13, 2015.

Chinese Office Action (Application No. 201210320609.8) Dated Jan. 14, 2016.

Liu,Y, Handbook of Physicochemical Properties and Important Reaction Equations of Inorganic Materials, Apr. 1, 1993, pp. 513-514.

* cited by examiner

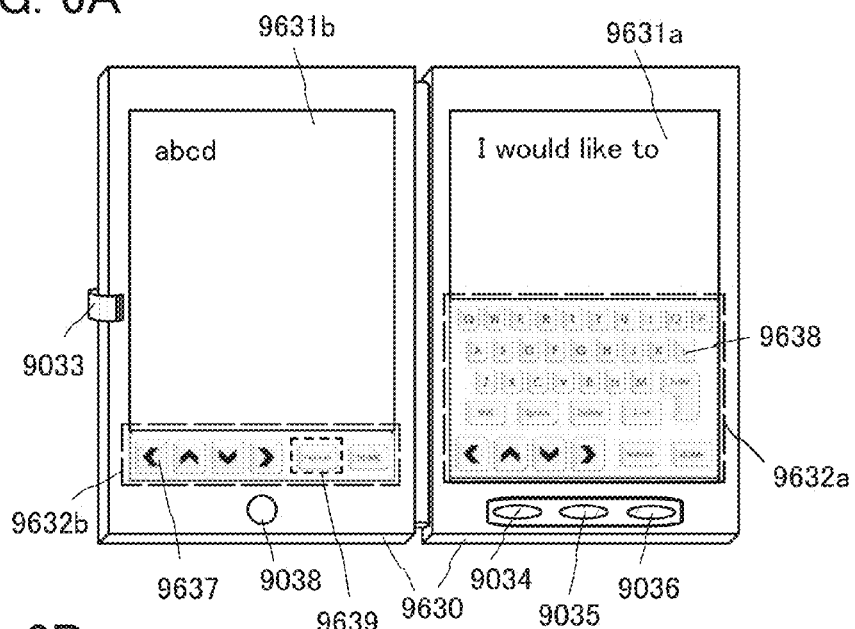
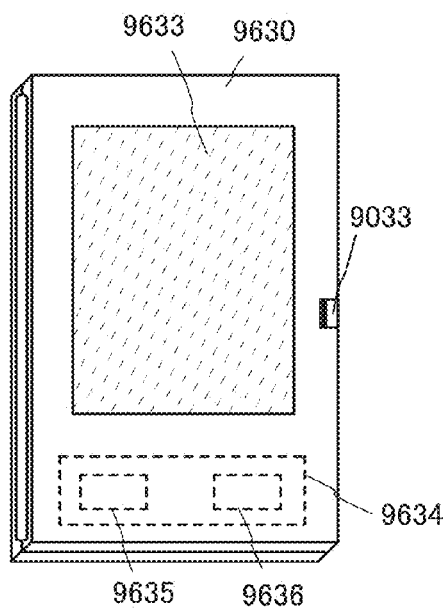
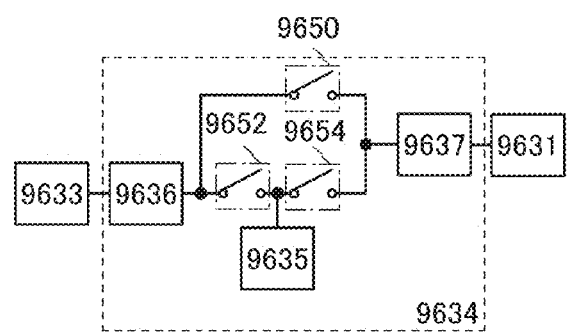

ALKALI METAL SILICATE, ALKALI TRANSITION METAL SILICATE, AND METHOD FOR SYNTHESIZING SILICATE

TECHNICAL FIELD

The present invention relates to a method for synthesizing alkali transition metal silicate, and alkali transition metal silicate which is formed by the synthesis method.

The present invention also relates to a positive electrode whose active material is alkali transition metal silicate, and a method for forming the positive electrode. Further, the present invention relates to a power storage device including the positive electrode, and a method for fabricating the power storage device. Note that in this specification, power storage devices refer to any elements and devices which have a function of storing electric power.

BACKGROUND ART

In recent years, power storage devices such as lithium secondary batteries and lithium-ion capacitors have been developed.

Alkali metal silicate such as lithium silicate can be a precursor in synthesis of lithium transition metal silicate salt, which is a positive electrode active material of power storage devices such as lithium secondary batteries (see Patent Document 1).

For example, lithium transition metal (M) phosphate ($LiMPO_4$) and lithium transition metal (M) silicate ($Li_2MSiO_4$), which are alkali metal salts, have been proposed as next-generation positive electrode active materials. Examples of the transition metal M include iron (Fe), manganese (Mn), nickel (Ni), and cobalt (Co).

As compared to an oxide such as $LiCoO_2$, which is a widely used positive electrode active material, $LiMPO_4$ and $Li_2MSiO_4$ mentioned above have high thermal stability. Even when an abnormal rise in the temperature of a lithium secondary battery occurs, $LiMPO_4$ and $Li_2MSiO_4$ generate less oxygen gas, and therefore an oxidation exothermic reaction of a flammable electrolyte can be suppressed.

In the case of $LiMPO_4$ mentioned above, lithium ions are inserted and extracted by a one-electron reaction, and the theoretical capacity of $LiMPO_4$ is approximately 170 mAh/g. In the case of $Li_2MSiO_4$, by contrast, lithium ions are inserted and extracted by a two-electron reaction, and the theoretical capacity of $Li_2MSiO_4$ is thus as large as approximately 330 mAh/g. It is known that the use of $Li_2MSiO_4$ for a positive electrode active material therefore allows the positive electrode to have high capacity.

Conventionally, a common way of synthesizing $Li_2MSiO_4$ utilizes a solid phase reaction. A typical solid phase reaction method includes a step of mixing compounds serving as sources of constituent elements for a long time with the use of a ball mill, and a step of performing heat treatment at 650° C. or higher and heat treatment at a temperature of higher than 1000° C. plural times, where heating time is half a day or longer (see Patent Document 2).

As a method for forming a positive electrode with the use of a positive electrode active material synthesized by a solid phase reaction, a method has been employed in which a synthesized positive electrode active material is ground and used for formation of a positive electrode (see Patent Document 1).

REFERENCE

Patent Document

[Patent Document 1] Japanese Published Patent Application No. 2009-104794
[Patent Document 2] Japanese Published Patent Application No. 2007-335325

DISCLOSURE OF INVENTION

However, in the present circumstances, it is considered that in the case where $Li_2MSiO_4$ is used as a positive electrode active material, capacity which is so sufficient as to reach the theoretical capacity of $Li_2MSiO_4$ is difficult to achieve. The reason for this is poor diffusibility of lithium ions in $Li_2MSiO_4$. Although microparticulation of a positive electrode active material can shorten diffusion lengths of lithium ions to improve diffusibility of the lithium ions, microparticulation of $Li_2MSiO_4$ is difficult since $Li_2MSiO_4$ is generally synthesized by a solid phase reaction as mentioned above.

Another problem is that in a solid phase reaction, long heat treatment leads to an increase in particle size of a synthesized positive electrode active material. When a positive electrode is formed with the use of such a positive electrode active material with an increased particle size, capacity per weight of the positive electrode is reduced, which hinders fabrication of a large-capacity lithium secondary battery.

For the above reason, conventionally, in a common method, a positive electrode active material synthesized by a solid phase reaction is mechanically ground so as to have a reduced particle size (microparticulation) and a positive electrode is formed using the microparticulated positive electrode active material. However, in mechanical grinding, the smallest possible particle size is limited. Although particle sizes can be conceivably equalized by performing mechanical grinding for a long time, equalization of particle sizes in a short time is difficult.

In view of the above, an object of one embodiment of the present invention is to provide a method for synthesizing alkali transition metal silicate which functions as a positive electrode active material of a power storage device and is easily microparticulated.

Another object of one embodiment of the present invention is to provide alkali transition metal silicate formed by the above synthesis method.

A further object of one embodiment of the present invention is to provide a method for synthesizing alkali metal silicate which is a precursor of the above alkali transition metal silicate, and alkali metal silicate formed by the synthesis method.

One embodiment of the present invention is a method for synthesizing alkali metal silicate which includes the following steps: a basic solution including an alkali metal salt is formed; the basic solution including the alkali metal salt is mixed with silicon particles to form a basic solution including the alkali metal silicate; and the basic solution including the alkali metal silicate is added to a poor solvent for the alkali metal silicate to precipitate the alkali metal silicate.

In the above method for synthesizing alkali metal silicate, the following steps may be performed: the precipitated alkali metal silicate is collected; and heat treatment is performed on the collected alkali metal silicate.

Another embodiment of the present invention is a method for synthesizing alkali transition metal silicate which includes the following steps: a basic solution including an alkali metal salt is formed; the basic solution including the alkali metal salt is mixed with silicon particles to form a basic solution including alkali metal silicate; the basic solution including the alkali metal silicate is added to a poor solvent for the alkali metal silicate to precipitate the alkali metal silicate; the precipitated alkali metal silicate is mixed with a microparticulated compound including a transition metal to form a mixture; and heat treatment is performed on the mixture to generate the alkali transition metal silicate.

In the above method for synthesizing alkali transition metal silicate, the following steps may be performed: the precipitated alkali metal silicate is collected; first heat treatment is performed on the collected alkali metal silicate; the alkali metal silicate subjected to the first heat treatment is mixed with the microparticulated compound including the transition metal to form a mixture; and second heat treatment is performed on the mixture to generate the alkali transition metal silicate.

The basic solution including the alkali metal salt preferably has pH of 9 or more. Further, the basic solution including the alkali metal silicate which is to be added to the poor solvent preferably has pH of 9 or more.

The temperature of the basic solution including the alkali metal salt is preferably kept higher than or equal to 50° C. and lower than or equal to 70° C.

Lithium silicate, which is one of alkali metal silicates, can be synthesized by using a lithium hydroxide aqueous solution as the above basic solution including the alkali metal salt, and linear alcohol or acetone as the above poor solvent.

By the above method for synthesizing alkali metal silicate, alkali metal silicate in which a specific surface area measured by gas adsorption is greater than or equal to 50 $m^2/g$ and less than or equal to 90 $m^2/g$ can be synthesized.

Further, by the above method for synthesizing alkali metal silicate, alkali metal silicate in which carbon atoms quantified by X-ray photoelectron spectroscopy are 10 at. % or less and sodium atoms quantified by X-ray photoelectron spectroscopy are 1 at. % or less can be synthesized.

In the above method for synthesizing alkali transition metal silicate, the transition metal included in the microparticulated compound including the transition metal is one or more of iron, manganese, nickel, and cobalt. In particular, a carbonate of any of the transition metals is preferably used.

Further, in the above method for synthesizing alkali transition metal silicate, the heat treatment (second heat treatment) which is performed on the mixture formed by mixing the precipitated alkali metal silicate and the microparticulated compound including the transition metal is preferably performed under an inert gas atmosphere at a temperature of higher than or equal to 700° C. and lower than or equal to 1000° C.

By the above method for synthesizing alkali transition metal silicate, alkali transition metal silicate in which a specific surface area measured by gas adsorption is greater than or equal to 50 $m^2/g$ and less than or equal to 150 $m^2/g$ can be synthesized.

According to one embodiment of the present invention, a method for synthesizing alkali transition metal silicate which is easily microparticulated can be provided. Specifically, a method for synthesizing lithium transition metal silicate which is easily microparticulated can be provided.

According to one embodiment of the present invention, microparticulated alkali transition metal silicate which has uniform particle sizes can be provided. Specifically, microparticulated lithium transition metal silicate which has uniform particle sizes can be provided.

Further, according to one embodiment of the present invention, a method for synthesizing alkali metal silicate which is a precursor of alkali transition metal silicate, and alkali metal silicate formed by the synthesis method can be provided.

According to one embodiment of the present invention, when microparticulated alkali transition metal silicate is used as a positive electrode active material of a power storage device, capacity per weight of the positive electrode can be increased, allowing fabrication of a lithium secondary battery having large capacity.

BRIEF DESCRIPTION OF DRAWINGS

FIGS. 6A to 6C illustrate an application mode of a power storage device.

BEST MODE FOR CARRYING OUT THE INVENTION

Figure 1:
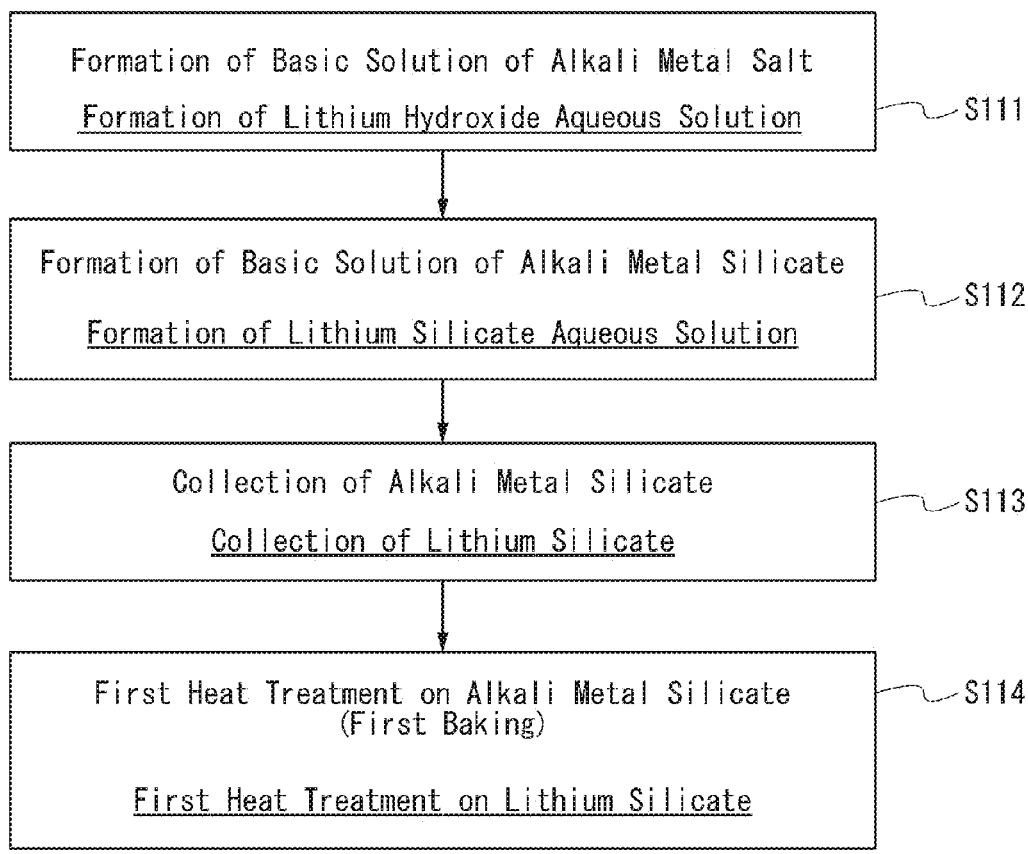
FIG. 1 illustrates a method for synthesizing alkali metal silicate.

In this specification, embodiments and examples will be described below with reference to the drawings. Note that the invention is not limited to the following description, and it will be easily understood by those skilled in the art that various changes and modifications can be made without departing from the spirit and scope of the invention. Thus, the present invention should not be interpreted as being limited to the following description of the embodiments. In description with reference to the drawings, in some cases, the same reference numerals are used in common for the same portions in different drawings. Further, in some cases, the same hatching patterns are applied to similar parts, and the similar parts are not necessarily designated by reference numerals.

(Embodiment 1)

In this embodiment, a method for synthesizing alkali transition metal silicate, according to one embodiment of the present invention will be described in detail with reference to the drawings. As a specific synthesis example, a synthesis example of lithium manganese silicate, in which the transition metal is manganese and the alkali metal is lithium, will be described.

In the method for synthesizing alkali transition metal silicate, according to one embodiment of the present invention, alkali metal silicate which is a precursor is synthesized and then reacted with a microparticulated compound including a transition metal. For example, lithium manganese silicate can be synthesized in such a manner that lithium silicate which is a precursor is synthesized and then reacted with a microparticulated manganese salt.

⟨Synthesis of Precursor⟩

Thus, to begin with, a method for synthesizing alkali metal silicate which is a precursor will be described.

FIG. 1 illustrates the method for synthesizing alkali metal silicate. Note that in steps shown in FIG. 1, underlined parts can be referred to for synthesis of lithium silicate which is a precursor of lithium manganese silicate.

⟨Step S111⟩

In the step S111, a basic solution including an alkali metal salt is formed. The alkali metal salt serves as an alkali metal source for alkali metal silicate.

Specifically, the basic solution is formed by dissolving the alkali metal salt in a good solvent for the alkali metal salt. The higher the basicity of the basic solution is, the more easily silicon particles are dissolved in the basic solution in a step S112 described later, increasing efficiency in the step S112. Thus, it is preferable to adjust the hydrogen ion exponent (pH) of the basic solution to 9 or more, e.g., approximately 10.

The formation of the basic solution including the alkali metal salt is preferably performed with the good solvent heated and the raised temperature kept so that the alkali metal salt is easily dissolved.

Note that in the case of synthesis of lithium silicate, in the step S111, a lithium hydroxide aqueous solution with pH of 10 is formed using lithium hydroxide and water respectively as the alkali metal salt and the good solvent.

⟨Step S112⟩

Then, in the step S112, a basic solution including alkali metal silicate is formed.

Specifically, silicon particles which are prepared as silicon sources for the alkali metal silicate are added to the basic solution including the alkali metal salt which is formed in the step S111, and the mixture is stirred. Thus, the alkali metal salt and the silicon particles react with each other emitting a hydrogen gas, whereby the alkali metal silicate is formed. Note that the alkali metal silicate is in a dissolved state in the good solvent for the alkali metal salt which is used in the step S111.

In the step S112, the mixture can be stirred mechanically with, for example, a device (e.g., magnetic stirrer or mechanical stirrer) provided with a stir bar in the shape of a stick, a plate, or a propeller.

Alternatively, instead of mechanical stirring, application of ultrasonic waves may be performed on the basic solution including the alkali metal salt to which the silicon particles are added in the step S112 so that the alkali metal salt and silicon are reacted with each other to form the alkali metal silicate.

Note that stirring is preferably continuously performed during the step S112 to prevent the silicon particles which are added from concentrating in the basic solution including the alkali metal salt.

In some cases, the reaction in the step S112 may generate plural kinds of alkali metal silicates with different compositions. That is, the alkali metal silicate included in the basic solution including the alkali metal silicate which is formed in the step S112 may be plural kinds of alkali metal silicates with different compositions.

Since the reaction in the step S112 is a liquid phase reaction, the method for synthesizing alkali metal silicate, according to one embodiment of the present invention is a synthesis method utilizing a liquid phase reaction.

The silicon particles used in the step S112 preferably have as high purity as possible, but may contain one or more of other metal elements, silicon oxide, and silicon nitride. For example, a known silicon powder can be used.

Moreover, the particle size (e.g., grain diameter) of the silicon particles is not particularly limited because in the step S112, the mixture is stirred until the silicon particles are dissolved in the basic solution including the alkali metal salt. Yet, the particle size (e.g., grain diameter) of the silicon particles is preferably as small as possible because silicon particles with a smaller particle size are more easily dissolved in the basic solution including the alkali metal salt.

Further, in the case where the temperature of the basic solution including the alkali metal salt which is formed in the step S111 is made higher than room temperature, dissolution of the silicon particles in the basic solution is facilitated, whereby the liquid phase reaction in the step S112 can proceed efficiently.

For example, the temperature of the basic solution including the alkali metal salt which is formed in the step S111 is made higher than or equal to 50° C. and lower than or equal to 70° C., preferably around 60° C., whereby the liquid phase reaction in the step S112 can proceed efficiently.

In the synthesis method according to one embodiment of the present invention, to increase the specific surface area (i.e., to reduce the particle size) of the alkali metal silicate, the concentration of silicon in the basic solution including the alkali metal salt to which the silicon particles are added is preferably made high; however, because the specific surface area of the alkali metal silicate with respect to the silicon concentration has a maximum value in some cases, it is preferable that the silicon concentration be appropriately selected such that a desired specific surface area can be obtained. For example, the concentration can be around 0.3 mol/l.

In addition, in the step S112, the silicon particles are preferably mixed such that the alkali metal salt content exceeds the silicon particles content. That is, the silicon particles are preferably added such that the number of moles of silicon is larger than the number of moles of the alkali metal in the basic solution including the alkali metal salt to which the silicon particles are added. In this manner, unreacted silicon can be reduced, which leads to improvement in yield of the alkali metal silicate, an objective substance. Further, the composition of the alkali metal silicate can be controlled by changing the ratio of the number of moles of silicon to the number of moles of the alkali metal in the step S112 (specifically, in the basic solution including the alkali metal salt to which the silicon particles are added).

Note that in the case of synthesis of lithium silicate, in the step S112, a lithium silicate aqueous solution is formed in the following manner: the lithium hydroxide aqueous solution formed in the step S111 is heated to 60° C.; and silicon particles are added to the lithium hydroxide aqueous solution with the temperature of 60° C. kept and the mixture is mechanically stirred to make lithium hydroxide and silicon be reacted with each other.

⟨Step S113⟩

Next, in the step S113, the alkali metal silicate is collected from the basic solution including the alkali metal silicate which is formed in the step S112.

Specifically, a poor solvent for the alkali metal silicate is prepared and the basic solution including the alkali metal silicate which is formed in the step S112 is added to the poor solvent, so that the alkali metal silicate is precipitated in the poor solvent. After the precipitation, one or more of filtration, centrifugation, dialysis, and the like is performed to collect the alkali metal silicate. Then, the collected alkali metal silicate is dried.

In the step S113, where the good solvent for the alkali metal salt and the poor solvent for the alkali metal silicate (the objective substance) are mingled with each other, a composition of the precipitated alkali metal silicate may change depending on affinity of the poor solvent for the good solvent. For example, when the affinity for the good solvent is low, in the precipitated alkali metal silicate, a composition of alkali metal to silicon tends to be high. In addition, even when the composition of the precipitated alkali metal silicate does not change, the particle size of the precipitated alkali metal silicate may change depending on the affinity of the poor solvent for the good solvent. In view of the above, it is preferable that the poor solvent be appropriately selected such that the alkali metal silicate is precipitated having a desired composition and a desired particle size.

For example, in the case where the alkali transition metal silicate according to one embodiment of the present invention is used as a positive electrode active material of a power storage device, the specific surface area of the alkali transition metal silicate which is measured by gas adsorption is preferably greater than or equal to 50 $m^2/g$ and less than or equal to 150 $m^2/g$ (preferably greater than or equal to 50 $m^2/g$ and less than or equal to 70 $m^2/g$). Thus, the alkali metal silicate which is the precursor is preferably formed such that the specific surface area thereof which is measured by gas adsorption is greater than or equal to 50 $m^2/g$ and less than or equal to 90 $m^2/g$. Note that in the alkali transition metal silicate and the alkali metal silicate, there is a correlation between the particle size and the specific surface area measured by gas adsorption; the larger the specific surface area is, the particle size (e.g., grain diameter) tends to be small. Measurement of a specific surface area by gas adsorption can be carried out with the use of TriStar II 3020 (manufactured by SHIMADZU CORPORATION), a micromeritics automatic surface area and porosimetry analyzer. This analyzer measures the surface area of a sample in such a manner that nitrogen is adsorbed to the sample for a predetermined period and the amount of adsorbed nitrogen is determined.

Various methods by which the alkali metal silicate is precipitated in the poor solvent can be used. For example, the alkali metal silicate is precipitated by dropwise addition of the basic solution including the alkali metal silicate to the poor solvent. Or a predetermined amount of the basic solution including the alkali metal silicate is added to the poor solvent under stirring or under application of ultrasonic waves, whereby the alkali metal silicate, which is the objective substance, can be precipitated. Note that the amount of the poor solvent is made larger than that of the basic solution including the alkali metal silicate which is added. Further, stirring of the poor solvent can be performed mechanically with the use of a device similar to that used in the step S112.

In the method in which the basic solution including the alkali metal silicate is added dropwise to the poor solvent, the amount of the poor solvent is made larger than the final amount of the basic solution including the alkali metal silicate which is added. This method in which the basic solution is added dropwise is preferably employed, in which case the particle sizes of the precipitated alkali metal silicate can be small and uniform as compared to those obtained by the other methods described above. To obtain alkali metal silicate with a small particle size, it is preferable that the rate at which the basic solution is added dropwise be made low and the size of the drop be made small. The size of the drop can be made small by reducing the amount of liquid added dropwise at a time or reducing the bore of a nozzle of a device with which the liquid is added dropwise. Note that in this specification, a rate at which liquid is added dropwise refers to the amount of the supplied liquid per hour. For example, the rate at which the basic solution is added dropwise to the poor solvent is preferably higher than or equal to 40 ml/h and lower than or equal to 80 ml/h.

Further, the dropwise addition of the basic solution including the alkali metal silicate to the poor solvent is preferably performed while the poor solvent is stirred. As a stirring method, mechanical stirring with a device similar to that in the step S112 or application of ultrasonic waves may be employed. Note that the particle sizes of the alkali metal silicate to be precipitated also depend on the conditions of stirring (e.g., the frequency of a rotation); thus, it is preferable that the conditions of stirring be selected appropriately.

The alkali metal silicate collected by one or more of filtration, centrifugation, dialysis, and the like can be dried by being heated in a vacuum atmosphere or an inert gas atmosphere. The heating time and heating temperature can be set such that the solvents (the good solvent in the step S111 and the poor solvent in the step S113) contained in the collected alkali metal silicate are removed, taking account of the boiling points of the good solvent and the poor solvent, and the like. For example, it is possible to carry out vacuum drying in which a temperature of higher than or equal to 80° C. and lower than or equal to 200° C. is kept for longer than or equal to 1 hour and shorter than or equal to 3 hours. Further, there is no limitation on a temperature raising rate and a temperature falling rate in the drying; the vacuum atmosphere may be maintained for a sufficient time after natural cooling is started.

Note that in the case of synthesis of lithium silicate, in the step S113, the lithium silicate aqueous solution is added dropwise to ethanol, which is a poor solvent for the lithium silicate, at a rate of around 40 ml/h, so that the lithium silicate is precipitated in the ethanol. Then, the precipitated lithium silicate is collected by filtration, and heated at 80° C. under a vacuum atmosphere for 2 hours with the temperature kept; after that, natural cooling is done for 2 hours with the vacuum atmosphere maintained, where the temperature decreases to room temperature.

In addition, in the case of synthesis of the lithium silicate, in the step S113, methanol, propanol, butanol, pentanol, acetone, or the like can be used instead of ethanol, which is the poor solvent for the lithium silicate.

⟨Step S114⟩

Next, the dried alkali metal silicate is subjected to first heat treatment (which can also be called first baking). Note that the first heat treatment includes a temperature increasing step, a heat-retention step, and a temperature reducing step. The expression "time of heat treatment" refers to time of the heat-retention step unless otherwise specified.

The particle size of the alkali metal silicate increases depending on the conditions of the first heat treatment in the step S114 in some cases. The particle size tends to increase when the temperature of the first heat treatment is high or the time of the first heat treatment is long. Therefore, it is preferable that the temperature of the first heat treatment be as low as possible and the time thereof be as short as possible.

One example of the first heat treatment is as follows. The first heat treatment is performed under a vacuum atmosphere or an inert gas atmosphere; the temperature of the first heat treatment is higher than or equal to 500° C. and lower than or equal to 600° C.; the time of the first heat treatment is longer than or equal to 1 hour and shorter than or equal to 24 hours, preferably longer than or equal to 10 hours and shorter than or equal to 15 hours.

In the step S114, the number of times of the first heat treatment can be one, in which case cycle time of the synthesis of the alkali metal silicate is shortened; however, it is possible to perform the first heat treatment plural times. Further, one heat treatment (one baking) may be performed by two steps: pre-baking and main baking. In this case, main baking is preferably performed at a temperature higher than that of pre-baking.

Drying performed in the step S113 and the first heat treatment may be sequentially performed with the same heating apparatus, in which case the cycle time of the synthesis of the alkali metal silicate can be shortened. Note that drying in the step S113 can be regarded as pre-baking, and the heat treatment in the step S114 can be regarded as main baking.

Note that the composition of the alkali metal silicate depends on the conditions of the first heat treatment in some cases. Thus, it is preferable that the conditions of the first heat treatment be appropriately selected so that a desired composition is obtained.

Although not shown in FIG. 1, the alkali metal silicate which has undergone the step S114 may be washed. By washing, the alkali metal salt which excessively exists in the step S112 can be removed. A solvent used in the washing is not particularly limited; water can be used, for example. After the washing, drying described in the step S113 is preferably performed.

Note that the first heat treatment here may be skipped, in which case second heat treatment described later serves as the first heat treatment.

Further, when the alkali metal silicate which has a composition different from a desired composition is generated in the synthesis of the alkali metal silicate which is the precursor of the alkali transition metal silicate, it is possible to collect alkali metal silicate with the desired composition by performing purification appropriately.

By the above steps, the alkali metal silicate which is the precursor of the alkali transition metal silicate can be synthesized.

Note that in the case of the synthesis of the lithium silicate, in the step S114, the dried lithium silicate is subjected to heat treatment at 520° C. under a nitrogen atmosphere for 10 hours. Then, washing with water is performed thereon for 1 hour and heating at 180° C. under a vacuum atmosphere is performed for 1 hour; after that, natural cooling is done for 2 hours with the vacuum atmosphere maintained, where the temperature decreases to room temperature. By the above steps, the lithium silicate which is a precursor of lithium manganese silicate can be synthesized.

The particle size of alkali transition metal silicate, which functions as a positive electrode active material for a power storage device, reflects the particle size of alkali metal silicate which is a precursor. Specifically, when the particle size of the alkali metal silicate which is the precursor is large, the particle size of the alkali transition metal silicate which is finally obtained is also large. For this reason, when a microparticulated precursor and a microparticulated compound including a transition metal are reacted with each other, microparticulated alkali transition metal silicate can be easily synthesized. In other words, synthesis utilizing small-particle-size (microparticulated) alkali metal silicate as the precursor is very useful for a reduction of the particle size of (i.e., for microparticulation of) the alkali transition metal silicate.

Furthermore, in some cases, the particle size of the alkali transition metal silicate which is finally obtained is difficult to reduce (microparticulation is difficult) by means of mechanical grinding because the alkali transition metal silicate has high mechanical strength. Also for this reason, synthesis utilizing small-particle-size (microparticulated) alkali metal silicate as the precursor is very useful for a reduction of the particle size of (i.e., for microparticulation of) the alkali transition metal silicate.

(Synthesis of Objective Substance)

Figure 2:
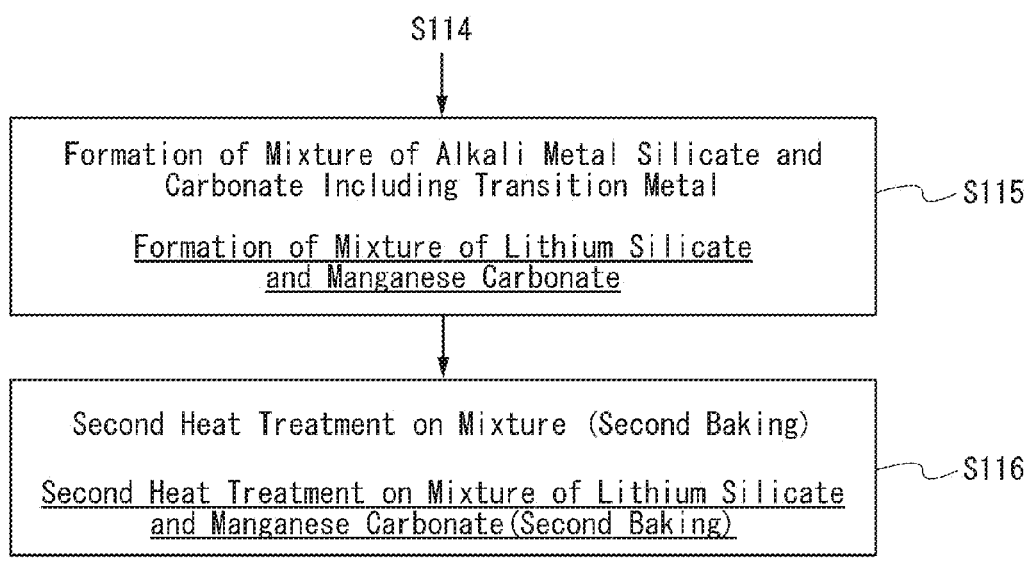
FIG. 2 illustrates a method for synthesizing alkali transition metal silicate.

Next, with reference to FIG. 2, a method will be described by which the alkali transition metal silicate (the objective substance) is synthesized with the use of the alkali metal silicate synthesized as the precursor. Note that in steps shown in FIG. 2, underlined parts can be referred to for synthesis of the lithium manganese silicate which is the objective substance with the use of the lithium silicate as the precursor.

(Step S115)

First, the alkali metal silicate synthesized by the steps S111 to S114 and a microparticulated compound including a transition metal are mixed to form a mixture. Mixed quantities of the alkali metal silicate and the microparticulated compound including the transition metal are adjusted depending on a composition of the alkali transition metal silicate which is the objective substance. For example, when a composition of the alkali metal is made to be twice as high as that of the transition metal, mixed quantities of the compounds are adjusted such that a molar ratio of the alkali metal silicate to the compound including the transition metal is 2.

The compound including the transition metal is preferably microparticulated in advance. As the microparticulation, mechanical grinding or grinding by application of ultrasonic waves can be performed. For example, the compound including the transition metal can be subjected to microparticulation in advance by being mechanically ground by ball mill treatment which will be described later.

Further, the compound including the transition metal which is mechanically ground to be microparticulated may be made to pass through a filter (e.g., membrane filter) with a desired pore size, or the like. By this operation, the large-size particles of the microparticulated compound including the transition metal can be removed and the particle sizes can be uniform.

In addition, by performing microparticulation on the compound including the transition metal in advance, the alkali metal silicate and the compound including the transition metal can be mixed uniformly and the alkali transition metal silicate which is the objective substance can be microparticulated. Further, crystallinity of the alkali transition metal silicate which is the objective substance can be increased.

The compound including the transition metal is a compound including one or more of iron, manganese, nickel, and cobalt, and is preferably a carbonate including one or more of iron, manganese, nickel, and cobalt.

Specifically, the mixture of the alkali metal silicate and the microparticulated compound including the transition metal can be formed by ball mill treatment. In the ball mill treatment, the alkali metal silicate, the compound including the transition metal, a solvent, and balls are put in a device (ball mill pot) and mixing is performed. As the solvent, alcohol such as acetone or ethanol can be used. After mixing, the solvent is preferably removed by heating the mixture. Metallic balls, ceramic balls, or the like can be used. The ball mill treatment is performed in such a manner that a ball mill with a ball diameter of greater than or equal to $\phi 0.5$ mm and less than or equal to $\phi 10$ mm is rotated at greater than or equal to 50 rpm and less than or equal to 500 rpm for longer than or equal to 30 minutes and shorter than or equal to 5 hours.

Further, the mixture of the alkali metal silicate and the microparticulated compound including the transition metal may be made to pass through a filter (e.g., membrane filter) with a desired pore size, or the like. By this operation, a mixture which has a large particle size can be removed and the particle sizes can be uniform.

Note that in the case of the synthesis of the lithium manganese silicate, in the step S115, a molar ratio of the lithium silicate to manganese carbonate that has been mechanically ground to be microparticulated is adjusted to obtain a desired composition, acetone is used as the solvent, and ball mill treatment is performed to form a mixture. Note that after the ball mill treatment, acetone as the solvent is evaporated by heating the mixture.

⟨Step S116⟩

Next, the mixture formed in the step S115 is subjected to the second heat treatment (also referred to as second baking).

Similarly to the case of the first heat treatment, depending on the conditions of the second heat treatment (heating temperature and heating time), the particle size of the alkali transition metal silicate which is the objective substance increases in some cases.

One example of the second heat treatment is as follows. The heat treatment (baking) is performed under a vacuum atmosphere or an inert gas atmosphere; the heating temperature is higher than or equal to 700° C. and lower than or equal to 1100° C.; and the heating time including a temperature increasing step and a temperature reducing step is longer than or equal to 1 hour and shorter than or equal to 24 hours, preferably longer than or equal to 10 hours and shorter than or equal to 15 hours.

At the time of the second heat treatment, in the case where the alkali metal silicate which is the precursor has a smaller particle size and is more microparticulated, the temperature of the second heat treatment can be set lower. The above heating temperature of the second heat treatment can be regarded as a relatively low temperature when the transition metal is manganese. Note that the baking temperature may be 1100° C. or higher.

In the step S116, the number of times of the second heat treatment may be one or more. When the number of times of the second heat treatment is one, cycle time of synthesis of the alkali transition metal silicate which is the objective substance can be shortened, leading to improved productivity.

Further, one heat treatment (baking) may be performed by two steps: pre-baking and main baking. In this case, main baking is preferably performed at a temperature higher than that of pre-baking. When one heat treatment (baking) is performed by two steps in this manner, crystallinity of the alkali transition metal silicate which is the objective substance can be improved.

Note that the mixture may be subjected to pressure treatment before being subjected to the second heat treatment. For example, the mixture can be pelletized before being subjected to the second heat treatment.

Note that in the case of the synthesis of the lithium manganese silicate, in the step S116, the mixture in the powder state which is formed in the step S115 is subjected to heat treatment under a nitrogen atmosphere at a heating temperature of 700° C. for 10 hours.

By the above-described steps, the alkali transition metal silicate according to one embodiment of the present invention can be synthesized.

In the method for synthesizing alkali transition metal silicate, according to one embodiment of the present invention, the small-particle-size (microparticulated) alkali metal silicate is used as the precursor; therefore, the number of times of the heat treatment performed on the mixture of the precursor and the compound including the transition metal can be as small as one, the heating time can be shortened, and the heating temperature can be low. Therefore, it is possible to suppress an increase in particle size which is caused by an increase in heating time, and an increase in particle size which is caused by an increase in heating temperature, so that the microparticulated alkali transition metal silicate can be easily synthesized.

The alkali transition metal silicate synthesized by the method for synthesizing alkali transition metal silicate, according to one embodiment of the present invention has been microparticulated to have a small particle size; thus, the alkali transition metal silicate has a smaller weight per particle than alkali transition metal silicate which is synthesized by a conventional solid phase reaction. In addition, since microparticulation is performed to obtain a small particle size, diffusibility of lithium ions is improved. Therefore, when the microparticulated alkali transition metal silicate according to one embodiment of the present invention is used as a positive electrode active material of a power storage device, capacity per weight of the positive electrode can be easily increased. Moreover, a lithium secondary battery having large capacity can be fabricated.

This embodiment can be combined with the structure described in any of the other embodiments and examples as appropriate.

(Embodiment 2)

In this embodiment, a power storage device according to one embodiment of the present invention will be described. Specifically, a power storage device will be described in which the alkali transition metal silicate described in Embodiment 1 is applied to a positive electrode active material.

The power storage device according to one embodiment of the present invention includes at least a positive electrode, a negative electrode, a separator, and an electrolyte.

In the power storage device according to one embodiment of the present invention, carrier ions are alkali metal ions, alkaline earth metal ions, beryllium ions, or magnesium ions. Examples of the alkali metal ions include lithium ions, sodium ions, and potassium ions. Examples of the alkaline earth metal ions include calcium ions, strontium ions, and barium ions.

In this embodiment, as an example of the power storage device according to one embodiment of the present invention, a lithium secondary battery in which carrier ions are lithium ions will be described.

Figure 3:
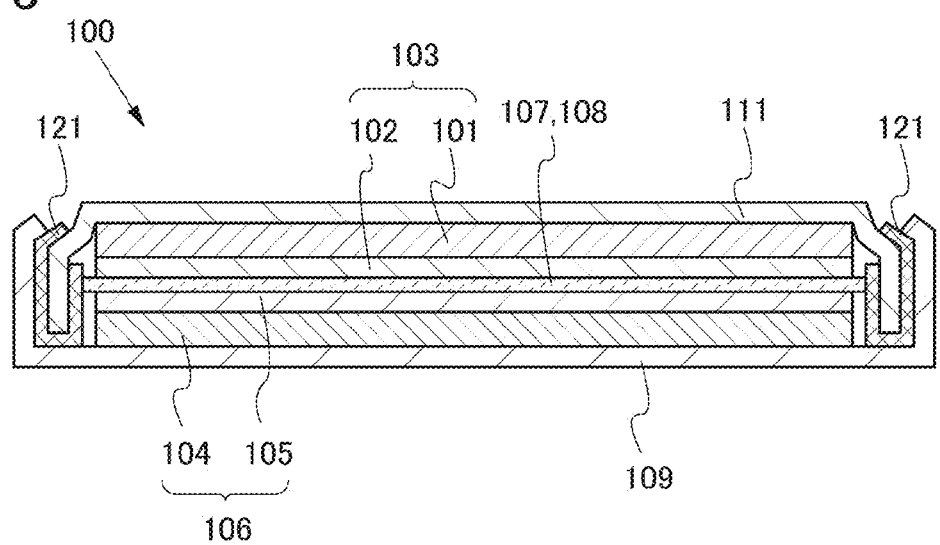
FIG. 3 is a cross-sectional view illustrating one mode of a power storage device.

FIG. 3 is a cross-sectional view of a lithium secondary battery 100. The lithium secondary battery 100 includes the following components: a positive electrode 103 including a positive electrode current collector 101 and a positive electrode active material layer 102, a negative electrode 106 including a negative electrode current collector 104 and a negative electrode active material layer 105, and a separator 108 provided between the positive electrode 103 and the negative electrode 106. Note that the separator 108 includes an electrolyte 107. Further, the positive electrode current collector 101 is connected to an external terminal 111, and the negative electrode current collector 104 is connected to an external terminal 109. An end portion of the external terminal 111 is embedded in a gasket 121. In other words, the external terminals 109 and 111 are insulated from each other with the gasket 121.

For the positive electrode current collector 101, a conductive material or the like can be used. Examples of the conductive material include aluminum (Al), copper (Cu), nickel (Ni), and titanium (Ti). In addition, an alloy material including two or more of the above-mentioned conductive materials can be used as the positive electrode current collector 101. Examples of the alloy material include an Al—Ni alloy and an Al—Cu alloy. Further, the positive electrode current collector 101 can be a conductive layer which has been separately formed over a substrate, and separated from the substrate.

The positive electrode active material layer 102 includes a positive electrode active material, a binder, and a conductive auxiliary agent (conductive additives). As the positive electrode active material, the alkali transition metal silicate described in Embodiment 1 can be used. Since the example described in this embodiment is a lithium secondary battery, a material including lithium is used as the positive electrode active material. Thus, lithium transition metal silicate can be used as the alkali transition metal silicate; for example, lithium manganese silicate ($Li_2MnSiO_4$) can be used.

Since the alkali transition metal silicate described in Embodiment 1 has a small particle size by microparticulation, the alkali transition metal silicate has a smaller weight per particle than alkali transition metal silicate synthesized by a conventional solid phase reaction, and improved diffusibility of lithium ions. Therefore, the weight of the positive electrode 103 can be reduced, and capacity per weight of the positive electrode can be increased. As a result, the lithium secondary battery can have high capacity as compared to a conventional one.

As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylidene fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given.

As the conductive auxiliary agent, any electron-conductive material can be used as long as it does not cause a chemical change in the power storage device. For example, a carbon-based material such as graphite or carbon fibers; a metal material such as copper, nickel, aluminum, or silver; or a powder or fiber of a mixture thereof can be used. Note that the conductive auxiliary agent may be formed in the form of a film to coat the positive electrode active material.

At the time of formation of the positive electrode active material layer 102, graphene or multilayer graphene may be mixed instead of the binder and the conductive auxiliary agent. Note that in this specification, graphene refers to a one-atom-thick sheet of carbon molecules having holes through which ions can pass and $sp^2$ bonds, or a stacked body of 2 to 100 one-atom-thick sheets of carbon molecules having holes through which ions can pass and $sp^2$ bonds. Note that in the graphene, the proportion of elements other than hydrogen and carbon is preferably 15 at. % or less, or the proportion of elements other than carbon is preferably 30 at. % or less. Note that an alkali metal such as potassium may be added to the graphene. In view of the above, graphene in this specification includes a graphene analogue.

With the use of graphene instead of the conductive auxiliary agent and the binder, as described above, the contents of the conductive auxiliary agent and the binder in the positive electrode 103 can be reduced. That is, the weight of the positive electrode 103 can be reduced, and capacity of the lithium secondary battery per weight of an electrode can be increased. As a result, the lithium secondary battery can have high capacity as compared to a conventional one.

Note that strictly speaking, an "active material" refers only to a material that relates to insertion and extraction of ions functioning as carriers. In this specification, however, in the case of using a coating method to form the positive electrode active material layer 102, for the sake of convenience, the positive electrode active material layer 102 collectively refers to the materials of the positive electrode active material layer 102, that is, a substance that is actually a "positive electrode active material," and the conductive auxiliary agent, the binder, or the like.

For the negative electrode current collector 104, a simple substance of copper (Cu), aluminum (Al), nickel (Ni), or titanium (Ti), or a compound of any of these elements can be used.

There is no particular limitation on a material used for the negative electrode active material layer 105 as long as it can dissolve and precipitate lithium and can be doped and dedoped with lithium ions. For example, lithium, aluminum, a carbon-based material, tin, silicon, a silicon alloy, or germanium can be used. It is also possible to use a compound including one or more materials selected from lithium, aluminum, a carbon-based material, tin, silicon, a silicon alloy, and germanium. For carbon into/from which lithium ions can be inserted and extracted, graphite based carbon such as a fine graphite powder, a graphite fiber, or graphite can be used. Silicon, a silicon alloy, germanium, lithium, aluminum, and tin have large capacities to occlude carrier ions as compared to carbon-based materials. Therefore, the negative electrode active material layer 105 can be formed using a less amount of material, which enables reductions in cost and the size of the lithium secondary battery 100.

Further, the negative electrode active material layer 105 may be formed to have an uneven shape by a printing method, an ink-jet method, CVD, or the like using any of the above materials. Alternatively, the negative electrode active material layer 105 may be formed to have an uneven shape in such a manner that any of the above material is provided in the form of a film by a coating method, a sputtering method, an evaporation method, or the like, and then is selectively removed.

Note that a simple substance of any of the above materials applicable to the negative electrode active material layer 105 may be used as the negative electrode without using the negative electrode current collector 104.

Graphene may be formed on a surface of the negative electrode active material layer 105. In that case, it is possible to suppress the influence which dissolution or precipitation of lithium, or insertion or extraction of lithium ions has on the negative electrode active material layer 105. The influence refers to pulverization or separation of the negative electrode active material layer 105 which is caused by expansion or contraction of the negative electrode active material layer 105.

The electrolyte 107 includes at least a solute which is a salt containing the above-mentioned carrier ions, and a solvent. For example, as the electrolyte 107, a nonaqueous solution in which the salt is dissolved or an aqueous solution in which the salt is dissolved can be used. Since this embodiment describes the lithium secondary battery as an example, a lithium salt containing lithium ions, which are carrier ions, is used. For example, a lithium salt such as $LiClO_4$, $LiAsF_6$, $LiBF_4$, $LiPF_6$, and $Li(C_2F_5SO_2)_2N$ can be given. Note that when carrier ions are alkali metal ions other than lithium ions or alkaline earth metal ions, an alkali metal salt (e.g., sodium salt or potassium salt), an alkaline earth metal salt (e.g., calcium salt, strontium salt, or barium salt), a beryllium salt, a magnesium salt, or the like can be used as the solute of the electrolyte 107.

The electrolyte 107 is preferably the nonaqueous solution in which a salt containing the above-mentioned carrier ions is dissolved. That is, as the solvent of the electrolyte 107, an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. Alternatively, as the aprotic organic solvent, one ionic liquid or a plurality of ionic liquids may be used. Owing to non-flammability and non-volatility of an ionic liquid, it is possible to suppress explosion, inflammation, and the like of the lithium secondary battery 100 at the time when the internal temperature of the lithium secondary battery 100 rises, resulting in improvement in safety.

Further, when a high molecular material which includes a salt containing the above-mentioned carrier ions and is gelled is used as the electrolyte 107, safety against liquid leakage and the like is improved and the lithium secondary battery 100 can be thinner and more lightweight. Examples of the gelled high-molecular material include a silicon gel, an acrylic gel, an acrylonitrile gel, polyethylene oxide, polypropylene oxide, and a fluorine-based polymer.

As the electrolyte 107, a solid electrolyte such as $Li_3PO_4$ can be used. Other examples of the solid electrolyte include $Li_xPO_yN_z$ (x, y, and z are positive real numbers) which is formed by mixing $Li_3PO_4$ with nitrogen; $Li_2S$—$SiS_2$; $Li_2S$—$P_2S_5$; and $Li_2S$—$B_2S_3$. Any of the above solid electrolytes which is doped with LiI can also be used.

As the separator 108, an insulating porous material is used. For example, paper; nonwoven fabric; a glass fiber; ceramics; a synthetic fiber containing nylon (polyamide), vinylon (polyvinyl alcohol based fiber), polyester, acrylic, polyolefin, or polyurethane; or the like may be used. Note that a material which does not dissolve in the electrolyte 107 needs to be selected.

Although a sealed button-type lithium secondary battery is described as the lithium secondary battery 100 in this embodiment, the form of the lithium secondary battery 100 is not limited thereto. That is, the power storage device according to one embodiment of the present invention, including the lithium secondary battery 100, can have a variety of forms such as a laminated type, a cylindrical type, or a square type. Further, although the lithium secondary battery 100 in this embodiment has the structure where the positive electrode 103, the negative electrode 106, and the separator 108 are stacked, a structure where the positive electrode 103, the negative electrode 106, and the separator 108 are rolled may be employed.

Next, a method for fabricating the power storage device according to one embodiment of the present invention will be described. First, a method for forming the positive electrode 103 will be described.

Materials for the positive electrode current collector 101 and the positive electrode active material layer 102 are selected from the above-described materials. Note that the positive electrode active material in the positive electrode active material layer 102 is the alkali transition metal silicate (specifically lithium manganese silicate ($Li_2MnSiO_4$)) described in Embodiment 1.

The positive electrode active material layer 102 is formed over the positive electrode current collector 101. The positive electrode active material layer 102 may be formed by a coating method or a sputtering method. In the case of forming the positive electrode active material layer 102 by a coating method, a paste in which the material for the positive electrode active material layer 102 is mixed with a conductive auxiliary agent, a binder, and the like is formed as slurry. Then, the slurry is applied on the positive electrode current collector 101 and dried. In the case of forming the positive electrode active material layer 102 by a coating method, pressure forming may be employed, if necessary. In the above manner, the positive electrode 103 in which the positive electrode active material layer 102 is formed over the positive electrode current collector 101 can be formed.

Next, a method for forming the negative electrode 106 will be described.

Materials for the negative electrode current collector 104 and the negative electrode active material layer 105 can be selected from the above-described materials. The negative electrode active material layer 105 can be formed over the negative electrode current collector 104 by a method similar to that in the case of the positive electrode 103. Note that in the case where a conductive auxiliary agent and a binder are used for the negative electrode 106, a material selected from the above-described materials can be used as appropriate.

In this embodiment, titanium foil is used for the negative electrode current collector 104, and silicon deposited by a chemical vapor deposition method or a physical vapor deposition method is used for the negative electrode active material layer 105.

The silicon for the negative electrode active material layer 105 may be any of amorphous silicon and crystalline silicon such as microcrystalline silicon, polycrystalline silicon, or single crystal silicon.

For example, as the negative electrode active material layer 105, a layer obtained by forming microcrystalline silicon over the negative electrode current collector 104 and then removing amorphous silicon from the microcrystalline silicon by etching may be used. When amorphous silicon is removed from microcrystalline silicon, the surface area of the remaining microcrystalline silicon is increased. Microcrystalline silicon can be formed by, for example, a plasma CVD method or a sputtering method.

Figure 4A:
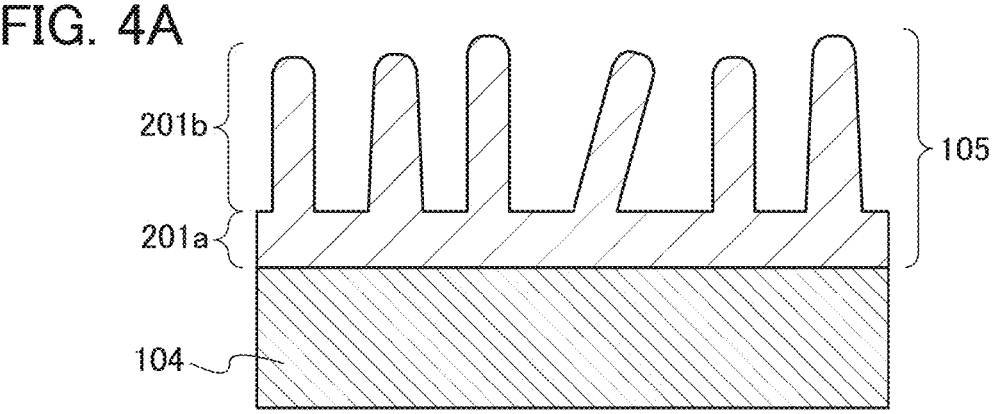
FIGS. 4A to 4C are cross-sectional views illustrating modes of a negative electrode of a power storage device.

Further, the negative electrode active material layer 105 may be whisker-like silicon which is formed over the negative electrode current collector 104 with a low pressure (LP) CVD apparatus (see FIG. 4A). Note that in this specification, whisker-like silicon refers to silicon having a common portion 201a and a region 201b protruding from the common portion 201a like a whisker (or a string or a fiber).

When the whisker-like silicon is made of amorphous silicon, high resistance to volume change due to occlusion and release of ions is achieved (e.g., stress due to volume expansion is relaxed), which can prevent pulverization and separation of the negative electrode active material layer due to repeated charging and discharging; thus, the cycle characteristics of the power storage device can be improved (see FIG. 4A).

Figure 4B:
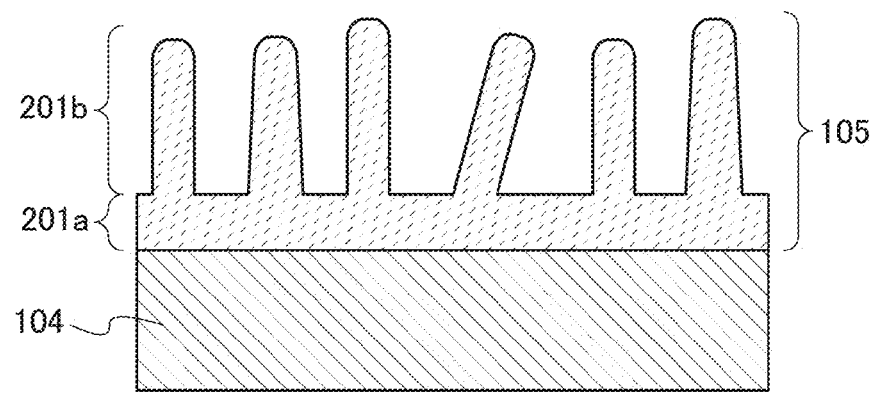

When the whisker-like silicon is made of crystalline silicon such as microcrystalline silicon, polycrystalline silicon, or single crystal silicon, a crystal structure having excellent conductivity, excellent ion mobility, and crystallinity is in contact with the current collector in a large area. Therefore, conductivity of the whole negative electrode can be improved, charging and discharging at higher speed becomes possible, and charge/discharge capacity of the power storage device can be further improved (see FIG. 4B).

Figure 4C:
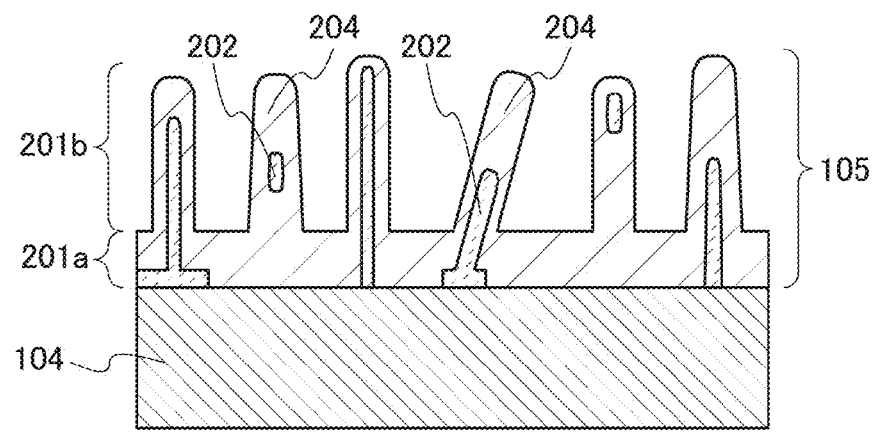

Further, the whisker-like silicon may include a core 202 made of crystalline silicon and an outer shell 204 made of amorphous silicon which covers the core (see FIG. 4C). In that case, the amorphous silicon of the outer shell 204 characteristically has high resistance to volume change due to occlusion and release of ions (e.g., relaxes stress due to volume expansion). Further, excellent conductivity and excellent ion mobility are exhibited by the crystalline silicon of the core 202, where the rate of occluding ions and the rate of releasing ions are high per unit mass. Therefore, the whisker-like silicon including the core 202 and the outer shell 204 is used for the negative electrode active material layer 105, whereby high-speed charging and discharging can be performed and the lithium secondary battery 100 can have improved charge/discharge capacity and improved cycle characteristics.

Note that in the common portion 201a, the crystalline silicon which forms the core 202 may be in contact with part of the top surface of the negative electrode current collector 104 as illustrated in FIG. 4C, or the entire top surface of the negative electrode current collector 104 may be in contact with the crystalline silicon.

Note that graphene or multilayer graphene can be formed on the surface of the negative electrode active material layer 105 in the following manner: the negative electrode current collector 104 which is provided with the negative electrode active material layer 105 is soaked together with a reference electrode in a solution containing graphene oxide; graphene oxide layers are formed over the surface of the negative electrode active material layer 105 by electrophoresis using the solution; and reduction treatment by heating is performed. Alternatively, graphene or multilayer graphene can be formed on the surface of the negative electrode active material layer 105 by a dip coating method using the above solution; after dip coating is performed, reduction treatment is performed by heating.

Note that the negative electrode active material layer 105 may be predoped with lithium. Predoping with lithium can be performed in such a manner that a lithium layer is formed on the surface of the negative electrode active material layer 105 by a sputtering method. Alternatively, a lithium foil is provided on the surface of the negative electrode active material layer 105, whereby the negative electrode active material layer 105 can be predoped with lithium.

The electrolyte 107 can be formed using a material appropriately selected from any of the above-mentioned materials. In this embodiment, a nonaqueous solution including lithium ions is formed by appropriately mixing $Li(CF_3SO_2)_2N$, which is a lithium salt, as the solute and ethylene carbonate as the solvent.

Then, the positive electrode 103, the separator 108, and the negative electrode 106, are impregnated with the electrolyte 107. Then, the negative electrode 106, the separator 108, the gasket 121, the positive electrode 103, and the external terminal 111 are stacked in this order over the external terminal 109, and the external terminal 109 and the external terminal 111 are crimped to each other with a "coin cell crimper." Thus, the coin-type lithium secondary battery 100 can be fabricated.

Note that a spacer and a washer may be provided between the external terminal 111 and the positive electrode 103 or between the external terminal 109 and the negative electrode 106 so that the connection between the external terminal 111 and the positive electrode 103 or between the external terminal 109 and the negative electrode 106 is enhanced.

This embodiment can be combined with the structure described in any of the other embodiments and examples as appropriate.

(Embodiment 3)

The power storage device according to one embodiment of the present invention can be used for power supplies of a variety of electric appliances which can operate with power.

Specific examples of electric appliances each utilizing the power storage device according to one embodiment of the present invention are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, and medical electrical equipment such as freezers for preserving DNA and dialyzers. In addition, moving objects driven by electric motors using power from power storage devices are also included in the category of electric appliances. Examples of the moving objects include electric vehicles, hybrid vehicles each including both an internal-combustion engine and an electric motor, and motorized bicycles including motor-assisted bicycles.

In the electric appliances, the power storage device according to one embodiment of the present invention can be used as a power storage device for supplying enough power for almost the whole power consumption (referred to as a main power supply). Alternatively, in the electric appliances, the power storage device according to one embodiment of the present invention can be used as a power storage device which can supply power to the electric appliances when the supply of power from the main power supply or a commercial power supply is stopped (such a power storage device is referred to as an uninterruptible power supply). Still alternatively, in the electric appliances, the power storage device according to one embodiment of the present invention can be used as a power storage device for supplying power to the electric appliances at the same time as the power supply from the main power supply or a commercial power supply (such a power storage device is referred to as an auxiliary power supply).

Figure 5:
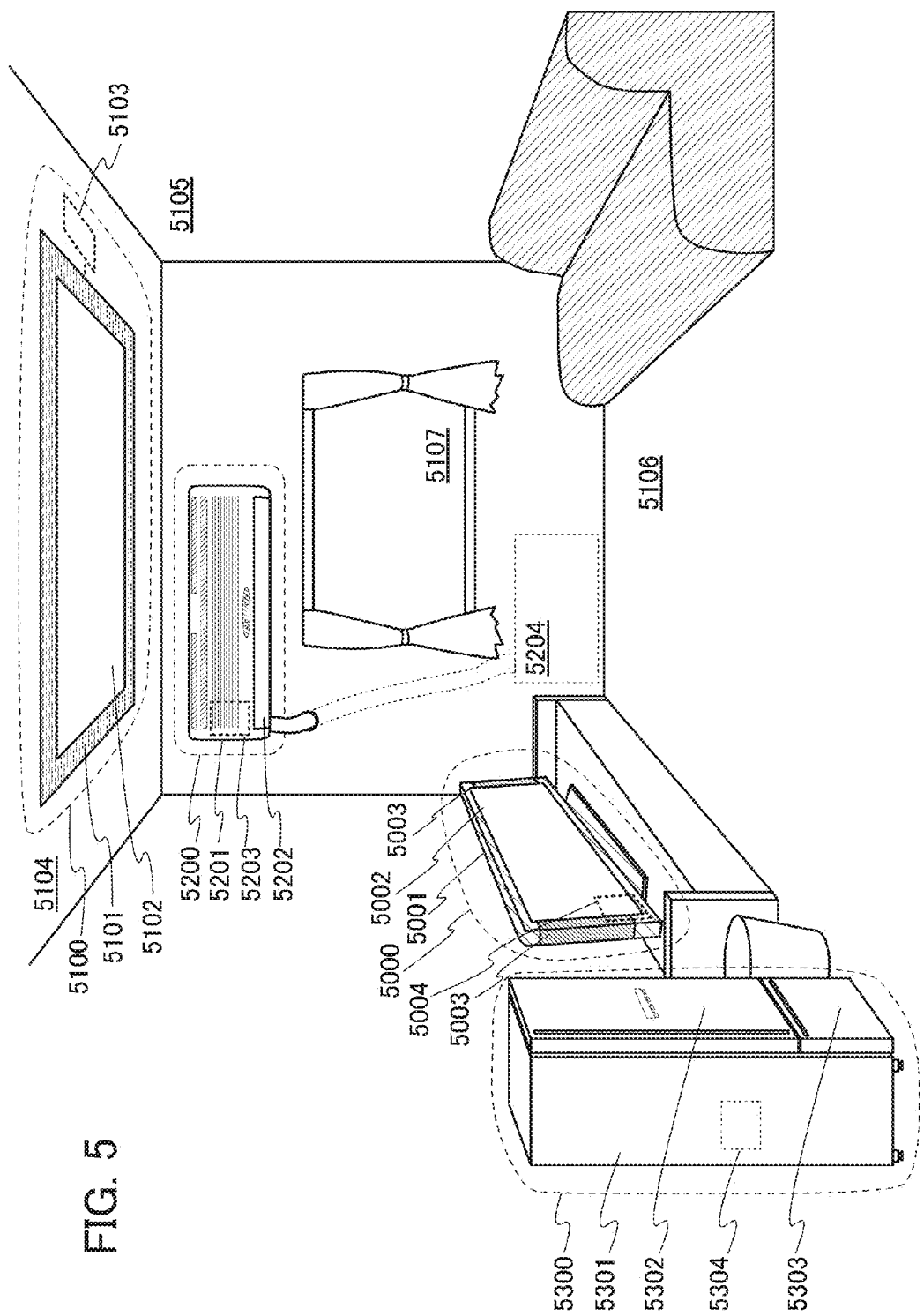
FIG. 5 illustrates application modes of a power storage device.

FIG. 5 illustrates specific structures of the electric appliances. In FIG. 5, a display device 5000 is an example of an electric appliance including a power storage device 5004 according to one embodiment of the present invention. Specifically, the display device 5000 corresponds to a display device for TV broadcast reception and includes a housing 5001, a display portion 5002, speaker portions 5003, the power storage device 5004, and the like. The power storage device 5004 according to one embodiment of the present invention is provided in the housing 5001. The display device 5000 can receive power from a commercial power supply. The display device 5000 can also use power stored in the power storage device 5004. Thus, the display device 5000 can operate with the use of the power storage device 5004 according to one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 5, an installation lighting device 5100 is an example of an electric appliance including a power storage device 5103 according to one embodiment of the present invention. Specifically, the lighting device 5100 includes a housing 5101, a light source 5102, the power storage device 5103, and the like. Although FIG. 5 illustrates the case where the power storage device 5103 is provided in a ceiling 5104 on which the housing 5101 and the light source 5102 are installed, the power storage device 5103 may be provided in the housing 5101. The lighting device 5100 can receive power from a commercial power supply. The lighting device 5100 can also use power stored in the power storage device 5103. Thus, the lighting device 5100 can operate with the use of the power storage device 5103 according to one embodiment of the present invention as an uninterruptible power supply even when power cannot be supplied from a commercial power supply due to power failure or the like.

Note that although the installation lighting device 5100 provided in the ceiling 5104 is illustrated in FIG. 5 as an example, the power storage device according to one embodiment of the present invention can be used in an installation lighting device provided in, for example, a wall 5105, a floor 5106, a window 5107, or the like other than the ceiling 5104. Alternatively, the power storage device can be used in a tabletop lighting device or the like.

As the light source 5102, an artificial light source which emits light artificially by using power can be used. Specifically, an incandescent lamp, a discharge lamp such as a fluorescent lamp, and light-emitting elements such as an LED and an organic EL element are given as examples of the artificial light source.

In FIG. 5, an air conditioner including an indoor unit 5200 and an outdoor unit 5204 is an example of an electric appliance including a power storage device 5203 according to one embodiment of the invention. Specifically, the indoor unit 5200 includes a housing 5201, an air outlet 5202, the power storage device 5203, and the like. Although FIG. 5 illustrates the case where the power storage device 5203 is provided in the indoor unit 5200, the power storage device 5203 may be provided in the outdoor unit 5204. Alternatively, the power storage devices 5203 may be provided in both the indoor unit 5200 and the outdoor unit 5204. The air conditioner can receive power from a commercial power supply. The air conditioner can also use power stored in the power storage device 5203. Particularly in the case where the power storage devices 5203 are provided in both the indoor unit 5200 and the outdoor unit 5204, the air conditioner can operate with the use of the power storage device 5203 according to one embodiment of the present invention as an uninterruptible power supply even when power cannot be supplied from a commercial power supply due to power failure or the like.

Note that although the split-type air conditioner including the indoor unit and the outdoor unit is illustrated in FIG. 5 as an example, the power storage device according to one embodiment of the present invention can be used in an air conditioner in which the functions of an indoor unit and an outdoor unit are integrated in one housing.

In FIG. 5, an electric refrigerator-freezer 5300 is an example of an electric appliance including a power storage device 5304 according to one embodiment of the present invention. Specifically, the electric refrigerator-freezer 5300 includes a housing 5301, a door for a refrigerator 5302, a door for a freezer 5303, the power storage device 5304, and the like. The power storage device 5304 is provided in the housing 5301 in FIG. 5. The electric refrigerator-freezer 5300 can receive power from a commercial power supply. The electric refrigerator-freezer 5300 can also use power stored in the power storage device 5304. Thus, the electric refrigerator-freezer 5300 can operate with the use of the power storage device 5304 according to one embodiment of the present invention as an uninterruptible power supply even when power cannot be supplied from a commercial power supply due to power failure or the like.

Note that among the electric appliances described above, a high-frequency heating apparatus such as a microwave oven and an electric appliance such as an electric rice cooker require high power in a short time. The tripping of a breaker of a commercial power supply in the use of an electric appliance can be prevented by using the power storage device according to one embodiment of the present invention as an auxiliary power supply for supplying power which cannot be supplied enough by a commercial power supply.

In addition, in a time period when electric appliances are not used, particularly when the proportion of the amount of power which is actually used to the total amount of power which can be supplied from a commercial power supply source (such a proportion referred to as a usage rate of power) is low, power can be stored in the power storage device, whereby the usage rate of power can be reduced in a time period when the electric appliances are used. For example, in the case of the electric refrigerator-freezer 5300, power can be stored in the power storage device 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the power storage device 5304 is used as an auxiliary power supply; thus, the usage rate of power in daytime can be reduced.

This embodiment can be combined with the structure described in the other embodiment and examples as appropriate.

(Embodiment 4)

In this embodiment, an example of an electronic appliance which uses the power storage device described in the above embodiment will be described with reference to FIGS. 6A to 6C.

FIGS. 6A and 6B illustrate a tablet terminal that can be folded. FIG. 6A illustrates the tablet terminal which is open (unfolded). The tablet terminal includes a housing 9630, a display portion 9631a, a display portion 9631b, a switch 9034 for switching display modes, a power switch 9035, a switch 9036 for switching to power-saving mode, a fastener 9033, and an operation switch 9038.

Part of the display portion 9631a can be a touch panel region 9632a, and data can be input by touching operation keys 9638 that are displayed. Note that FIG. 6A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

Like the display portion 9631a, part of the display portion 9631b can be a touch panel region 9632b. When a finger, a stylus, or the like touches the place where a button 9639 for switching to keyboard display is displayed in the touch panel, keyboard buttons can be displayed on the display portion 9631b.

Touch input can be performed concurrently on the touch panel regions 9632a and 9632b.

The switch 9034 for switching display modes can switch display orientation (e.g., between landscape mode and portrait mode) and select a display mode (switch between monochrome display and color display), for example. With the switch 9036 for switching to power-saving mode, the luminance of display can be optimized in accordance with the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although FIG. 6A shows the example where the display area of the display portion 9631a is the same as that of the display portion 9631b, there is no particular limitation on the display portions 9631a and 9631b. They may differ in size and/or image quality. For example, one of them may be a display panel that can display higher-definition images than the other.

FIG. 6B illustrates the tablet terminal which is closed. The tablet terminal includes the housing 9630, a solar battery 9633, a charge/discharge control circuit 9634, a battery 9635, and a DC to DC converter 9636. As an example, FIG. 6B illustrates the charge/discharge control circuit 9634 including the battery 9635 and the DC to DC converter 9636.

Since the tablet terminal can be folded, the housing 9630 can be closed when the tablet terminal is not in use. Thus, the display portions 9631a and 9631b can be protected, thereby providing a tablet terminal with high endurance and high reliability for long-term use.

The tablet terminal illustrated in FIGS. 6A and 6B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

Power can be supplied to the touch panel, the display portion, an image signal processor, and the like by the solar battery 9633 attached on a surface of the tablet terminal. The solar battery 9633 can be provided on at least one surface of the housing 9630 to efficiently charge the battery 9635, which is favorable. The use of the power storage device according to one embodiment of the present invention as the battery 9635 brings an advantage such as a reduction in size.

The structure and operation of the charge/discharge control circuit 9634 illustrated in FIG. 6B will be described with reference to a block diagram in FIG. 6C. FIG. 6C illustrates the solar battery 9633, the battery 9635, the DC to DC converter 9636, a converter 9637, switches 9650, 9652, and 9654, and the display portion 9631. The battery 9635, the DC to DC converter 9636, the converter 9637, and switches 9650, 9652, and 9654 correspond to the charge/discharge control circuit 9634 illustrated in FIG. 6B.

An example of the operation performed when power is generated by the solar battery 9633 using external light is described. The voltage of power generated by the solar battery 9633 is raised or lowered by the DC to DC converter 9636 so as to be a voltage for charging the battery 9635. Then, when power from the solar battery 9633 is used for the operation of the display portion 9631, the switch 9650 is turned on and the voltage of the power is raised or lowered by the converter 9637 so as to be a voltage needed for the display portion 9631. When images are not displayed on the display portion 9631, the switch 9650 is turned off and the switch 9652 is turned on so that the battery 9635 is charged.

Here, the solar battery 9633 is shown as an example of a power generation means; however, there is no particular limitation on a way of charging the battery 9635, and the battery 9635 may be charged with another power generation means such as a piezoelectric element or a thermoelectric conversion element (Peltier element). For example, the battery 9635 may be charged with a non-contact power transmission module that transmits and receives power wirelessly (without contact) to charge the battery or with a combination of other charging means.

It is needless to say that one embodiment of the present invention is not limited to the electric appliance illustrated in FIGS. 6A to 6C as long as the power storage device described in the above embodiment is included.

This embodiment can be combined with the structure described in any of the other embodiments as appropriate.

Example 1

In this example, lithium silicate was synthesized as an example of the alkali metal silicate according to one embodiment of the present invention, and results of evaluation of the synthesized lithium silicate will be described.

A synthesis method in this example will be described with reference to FIG. 1 and FIG. 2, especially the underlined parts in the steps. Note that in this example, lithium hydroxide was used as an alkali metal salt, water was used as a good solvent for the lithium hydroxide, and ethanol was used as a poor solvent for the lithium hydroxide.

First, 400 ml of water (ion-exchange water) was put in a reaction container and heated to 60° C. With the temperature kept at 60° C., 20.14 g of lithium hydroxide dihydrate was added while the water was stirred by the use of a stirring device, so that a lithium hydroxide aqueous solution was formed (the step S111). Note that stirring was performed until the lithium hydroxide dihydrate was completely dissolved, and pH of the formed lithium hydroxide aqueous solution was adjusted to 10.

Then, 3.37 g of a silicon powder manufactured by Kojundo Chemical Laboratory Co., Ltd. (purity: 99.999%, grain diameter: 75 μm or less) was added while the temperature of the formed lithium hydroxide aqueous solution was kept at 60° C., and the mixture was stirred until the silicon powder was dissolved completely to cause a liquid phase reaction between the lithium hydroxide and the silicon powder; thus, a lithium silicate aqueous solution was formed (the step S112). Note that although lithium silicate formed by the liquid phase reaction includes lithium metasilicate ($Li_2SiO_3$) as a main product, one or both of lithium orthosilicate ($Li_4SiO_4$) and $Li_2Si_2O_5$ may be included as by-product in some cases. A chemical reaction formula of this liquid phase reaction is shown below.

$$4LiOH+2Si+2H_2O \rightarrow 2Li_2SiO_3+4H_2\uparrow \text{[Chemical Reaction Formula 1]}$$

In the step S112, the mass of the added silicon powder corresponded to one fourth of the number of moles of the lithium hydroxide used in the step S111. Further, in this example, the amount of the water in the lithium hydroxide aqueous solution was adjusted in the step S111 so that the concentration of silicon in the formed lithium silicate aqueous solution was 0.3 mol/l in the step S112.

Then, the lithium silicate aqueous solution was added to ethanol which was being stirred at 500 rpm to 600 rpm, so that the lithium silicate was precipitated in the ethanol. In this example, a small amount of the lithium silicate aqueous solution was measured and put in a syringe; then, the lithium silicate aqueous solution was added dropwise from the syringe to 400 ml of the ethanol at a rate of 40 ml/h.

Then, the ethanol in which the lithium silicate was precipitated was filtered to collect the lithium silicate, and the collected lithium silicate was dried (the step S113). In this example, the lithium silicate was dried in the following manner: heating at 80° C. was kept under a vacuum atmosphere for 2 hours; then, natural cooling was done for 2 hours with the vacuum atmosphere maintained, where the temperature decreases to room temperature.

After that, the first heat treatment (first baking) was performed on the dried lithium silicate (the step S114). In this example, the heating temperature was 520° C. and heating was performed under a nitrogen atmosphere for 10 hours.

Then, the lithium silicate after the step S114 and 50 ml of water (ion-exchange water) were mixed, and the mixture was stirred at 300 rpm to 400 rpm for 1 hour for washing the lithium silicate. After that, the washed lithium silicate was dried in the following manner: heating at 180° C. was kept under a vacuum atmosphere for 1 hour; then, natural cooling was done for 2 hours with the vacuum atmosphere maintained, where the temperature decreases to room temperature. Thus, 1.0 g of white lithium silicate was obtained. The lithium silicate obtained by the steps S111 to S114 was lithium metasilicate ($Li_2SiO_3$). Note that the lithium silicate synthesized in this example is referred to as Compound A.

Next, evaluation of the property of Compound A will be described. As a comparative compound, commercially available lithium metasilicate ($Li_2SiO_3$) was prepared. The comparative compound was lithium metasilicate which had been synthesized by a synthesis method different from that of Compound A and undergone mechanical grinding.

⟨X-Ray Diffraction⟩

To identify Compound A and the comparative compound, evaluation by X-ray diffraction (XRD) was carried out.

Figure 7A:
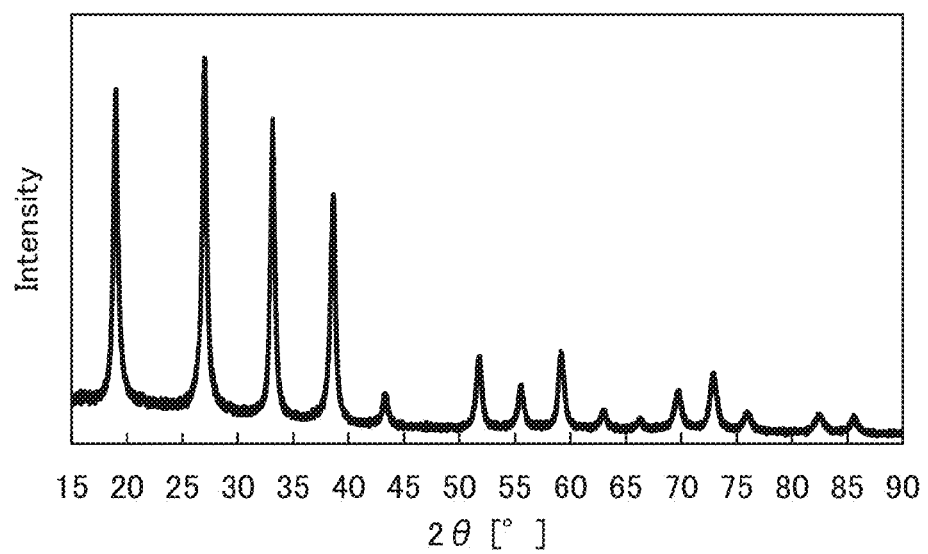
FIGS. 7A and 7B show X-ray diffraction patterns of Compound A and comparative compound, respectively.
Figure 7B:
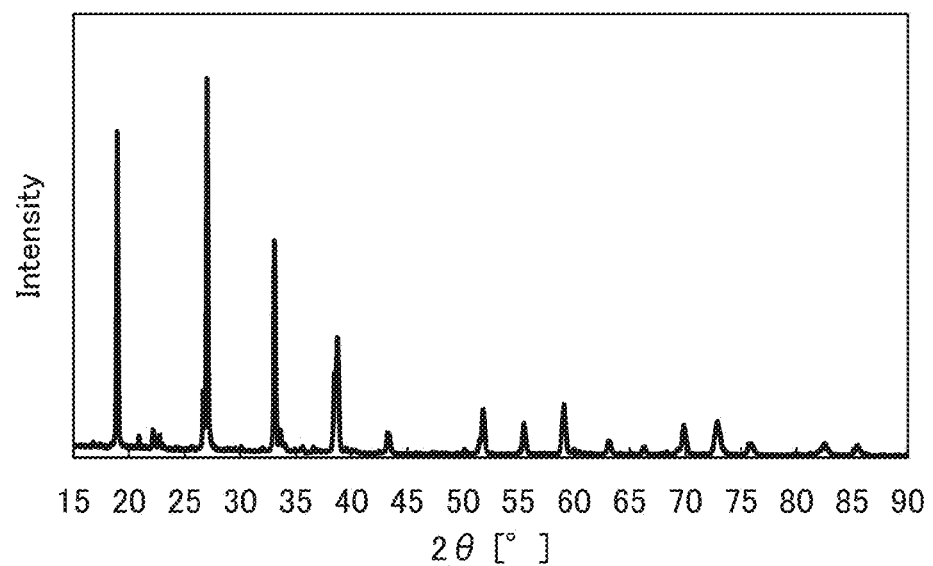

A diffraction pattern of Compound A is shown in FIG. 7A, and a diffraction pattern of the comparative compound is shown in FIG. 7B. The diffraction pattern of Compound A is the same as the standard diffraction pattern of lithium metasilicate ($Li_2SiO_3$). This confirms that Compound A, which was synthesized by the synthesis method described in this example, was lithium metasilicate. As well, it is confirmed that the comparative compound mainly includes lithium metasilicate; however, as shown in FIG. 7B, peaks derived from lithium carbonate ($Li_2CO_3$) are observed in a range where 2θ is 20° to 25°, which lithium carbonate is assumed to be an unreacted raw material used in formation of the comparative compound.

Note that although the lithium silicate formed in the step S112 may include one or both of lithium orthosilicate ($Li_4SiO_4$) and $Li_2Si_2O_5$ as by-product in addition to the lithium metasilicate ($Li_2SiO_3$), which is the main product, the finally obtained lithium silicate was able to be lithium metasilicate ($Li_2SiO_3$) with the use of the synthesis conditions in this example.

⟨Observation with SEM and Measurement of Specific Surface Area⟩

Figure 8A:
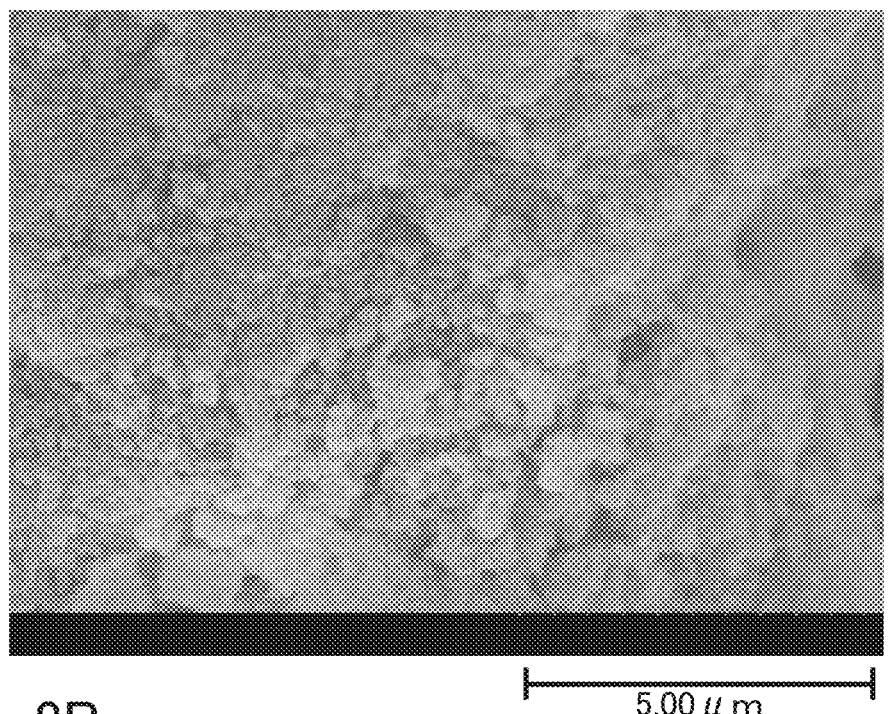
FIGS. 8A and 8B are plane SEM images of Compound A and comparative compound, respectively.
Figure 8B:
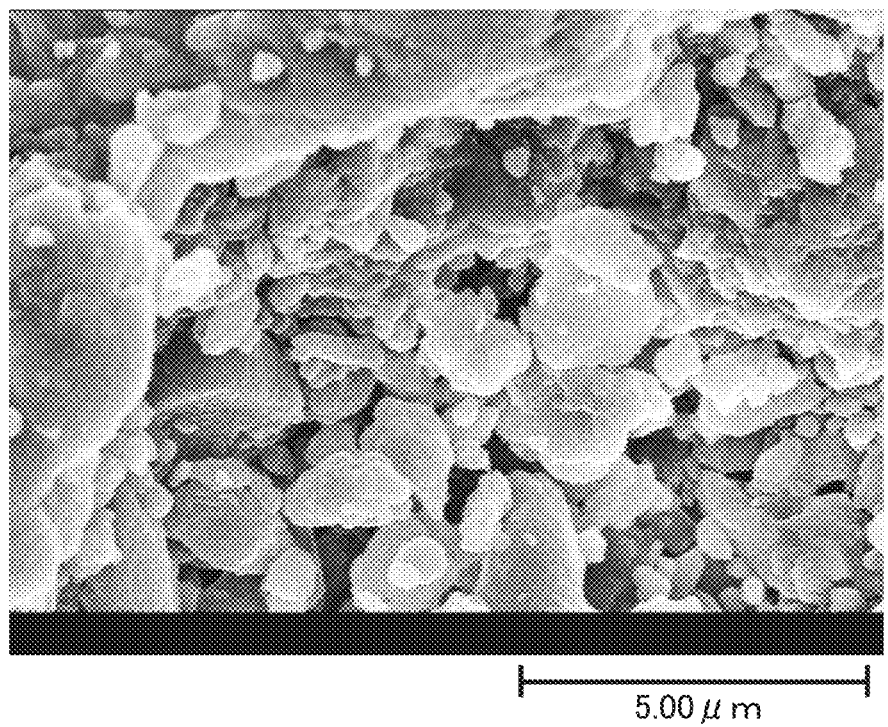

To observe surface shapes of Compound A and the comparative compound, observation with a scanning electron microscope (SEM) was carried out. A plane SEM image of Compound A is shown in FIG. 8A and that of the comparative compound is shown in FIG. 8B. The magnification of each of the images in FIGS. 8A and 8B is 10000 times.

FIGS. 8A and 8B show that particles of Compound A have smaller particle sizes than particles of the comparative compound and that Compound A is microparticulated. In addition, it is shown that the particles of Compound A have more uniform particle sizes than the particles of the comparative compound.

The specific surface areas of Compound A and the comparative compound were measured by gas adsorption. The measurement of a specific surface area in this example was carried out with the use of TriStar II 3020 (manufactured by SHIMADZU CORPORATION), a micromeritics automatic surface area and porosimetry analyzer. Note that this analyzer measures the surface area of a sample in such a manner that nitrogen is adsorbed to the sample for a predetermined period and the amount of adsorbed nitrogen is determined.

The measurement with the use of the above device revealed that the specific surface area of Compound A is 80.97 $m^2$/g and that of the comparative compound is 0.71 $m^2$/g. The smaller the particle size (e.g., grain diameter) of a sample is and the more the sample is microparticulated, the larger the specific surface area of the sample which is measured by gas adsorption tends to be. Therefore, the measurement confirmed that the particle size of Compound A is smaller than that of the comparative compound and that Compound A is more microparticulated.

⟨X-Ray Photoelectron Spectroscopy⟩

To quantify the compositions of Compound A and the comparative compound, evaluation by X-ray photoelectron spectroscopy (XPS) was carried out.

Table 1 shows the compositions of Compound A and the comparative compound and quantitative values (unit: at. %) of the compositions.

TABLE 1

|  | Li | Si | O | C | Na |
|---|---|---|---|---|---|
| Compound A | 26.3 | 16.2 | 56.6 | 1 | — |
| Comparative Compound | 27.5 | 5.9 | 52.2 | 13.9 | 0.5 |

As shown in Table 1, although Compound A and the comparative compound include carbon (C), which is an impurity element, Compound A includes far less carbon than the comparative compound. Detection of the lithium carbonate ($Li_2CO_3$), which is assumed to be an unreacted raw material, in the measurement by XRD provides evidence that the comparative compound includes more carbon than Compound A. In addition, it was confirmed that the comparative compound includes sodium (Na) as an impurity element, which was not detected in Compound A. Thus, Compound A was shown to have higher purity than the comparative compound.

The above results show that in the method for synthesizing alkali metal silicate, according to one embodiment of the present invention, alkali metal silicate can be microparticulated so that its particle sizes are uniform and made to be as small as ones which cannot be obtained by mechanical grinding.

By the method for synthesizing alkali metal silicate, according to one embodiment of the present invention, high-purity alkali metal silicate containing fewer impurities can be easily synthesized.

Example 2

In this example, the case will be described where, in the method for synthesizing alkali metal silicate, according to one embodiment of the present invention, a variety of poor solvents for alkali metal silicate to be precipitated were tested. Note that also in this example, lithium hydroxide was used as an alkali metal salt and water was used as a good solvent for the lithium hydroxide as in Example 1.

First, as in Example 1, the steps S111 and S112 were performed.

After that, a lithium silicate aqueous solution was added to poor solvents to precipitate lithium silicates in the poor solvents. In this example, methanol, ethanol, propanol, butanol, pentanol, and acetone were prepared as the poor solvents, and the lithium silicate aqueous solution was added to each of the poor solvents.

Then, the precipitated lithium silicates were collected and the collected lithium silicates were dried under the conditions similar to those in Example 1. After that, the step S114 was performed as in Example 1. The lithium silicate formed with the use of methanol as the poor solvent is referred to as Compound B; the lithium silicate formed with the use of propanol as the poor solvent, Compound C; the lithium silicate formed with the use of butanol as the poor solvent, Compound D; the lithium silicate formed with the use of pentanol as the poor solvent, Compound E; and the lithium silicate formed with the use of acetone as the poor solvent, Compound F.

To identify Compounds B to F, evaluation by X-ray diffraction (XRD) was carried out.

Figure 9A:
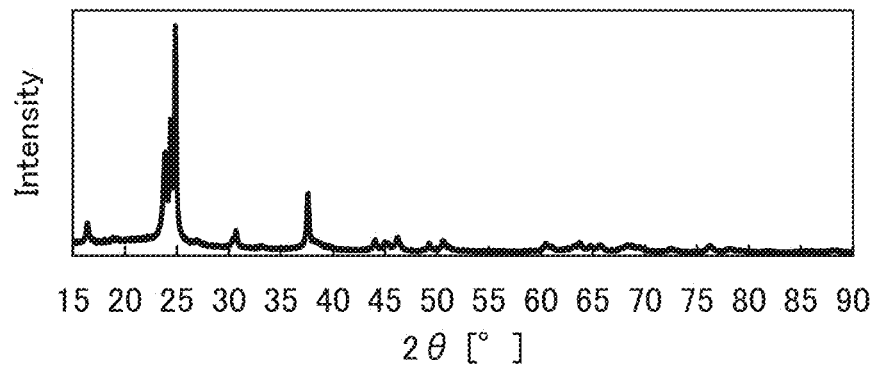
FIGS. 9A, 9B and 9C show X-ray diffraction patterns of Compounds B, C and D, respectively.
Figure 9B:
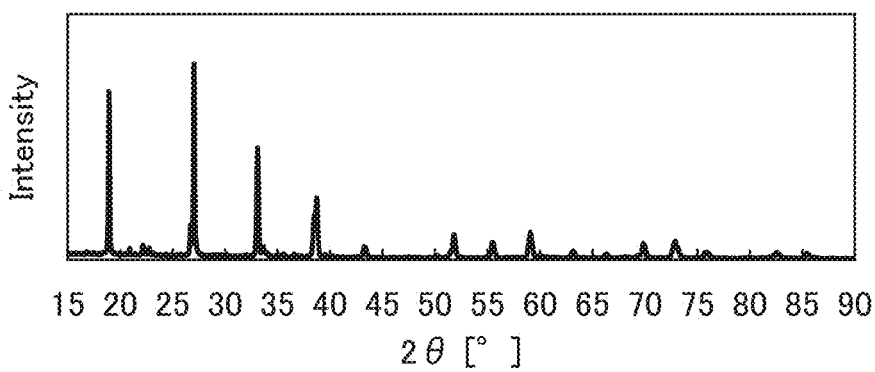
Figure 9C:
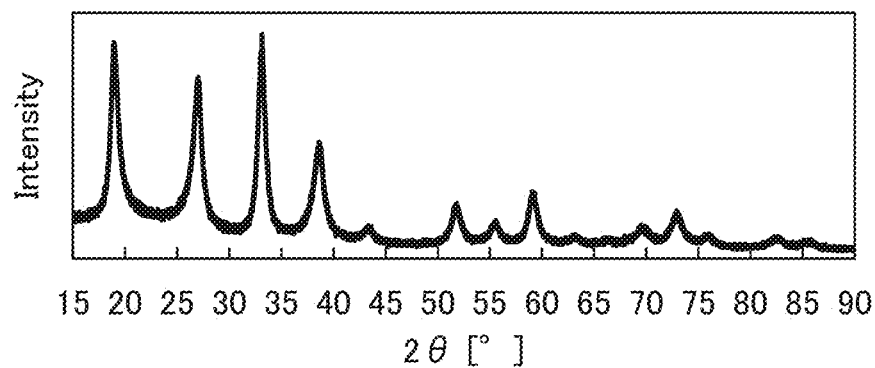
Figure 10A:
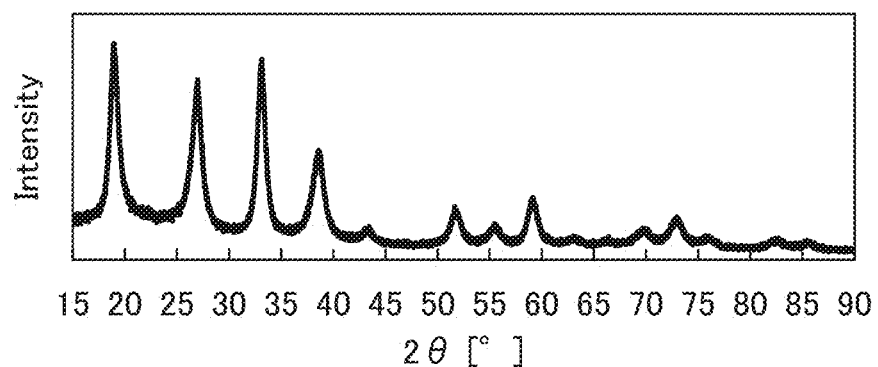
FIGS. 10A and 10B show X-ray diffraction patterns of Compounds E and F, respectively.
Figure 10B:
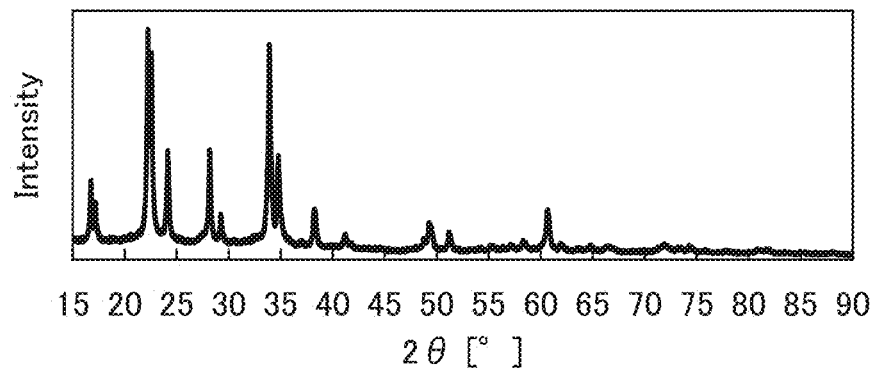

A diffraction pattern of Compound B is shown in FIG. 9A; that of Compound C, FIG. 9B; that of Compound D, FIG. 9C; that of Compound E, FIG. 10A; and that of Compound F, FIG. 10B. From FIGS. 9A to 9C and FIGS. 10A and 10B, it is confirmed that the compositions of the obtained lithium silicates change depending on the kind of the poor solvent used.

In a descending order of affinity for water, which was used as the good solvent, the poor solvents prepared in this example are arranged as follows: methanol, ethanol, propanol, butanol, pentanol, and acetone.

From FIG. 9A, in the case where the poor solvent was methanol with the highest affinity for water (good solvent), the obtained lithium silicate (Compound B) was $Li_2Si_2O_5$. From FIG. 10B, in the case where the poor solvent was acetone with the lowest affinity for water (good solvent), the obtained lithium silicate (Compound F) was lithium orthosilicate ($Li_4SiO_4$).

Figure 11A:
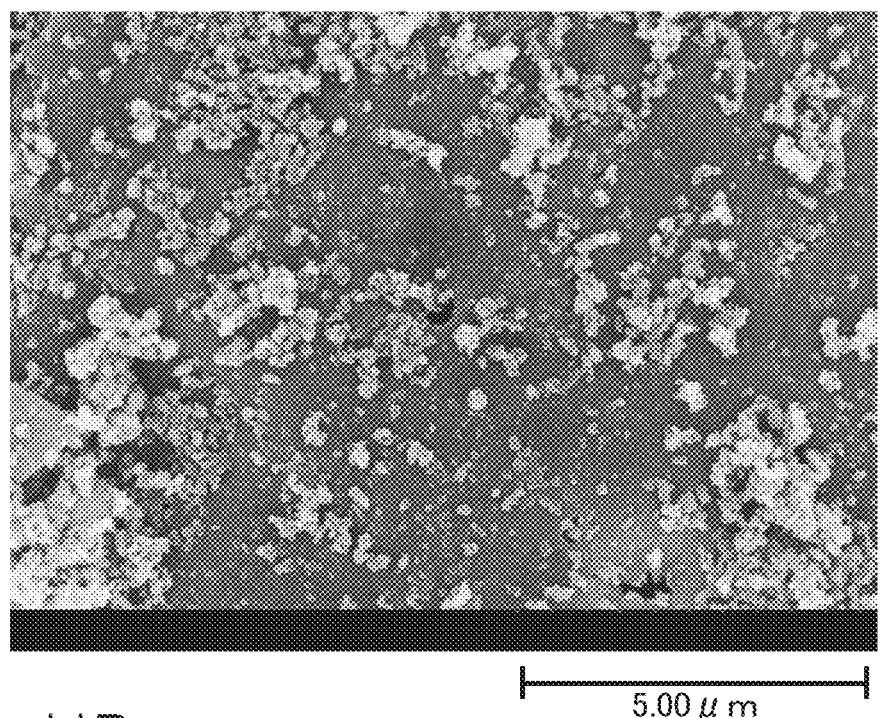
FIGS. 11A and 11B are plane SEM images of Compounds C and D, respectively.
Figure 11B:
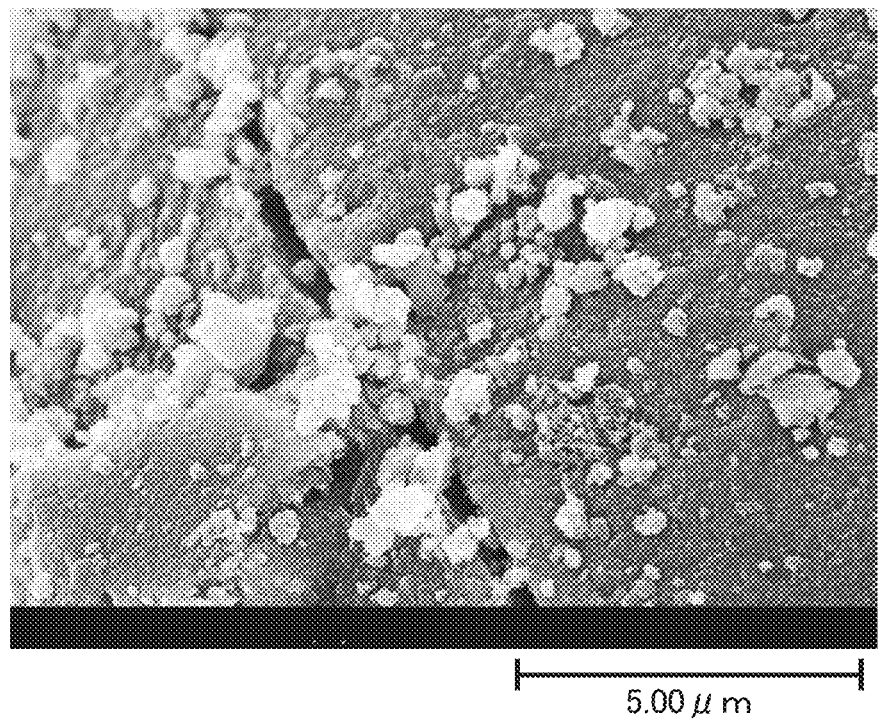
Figure 12:
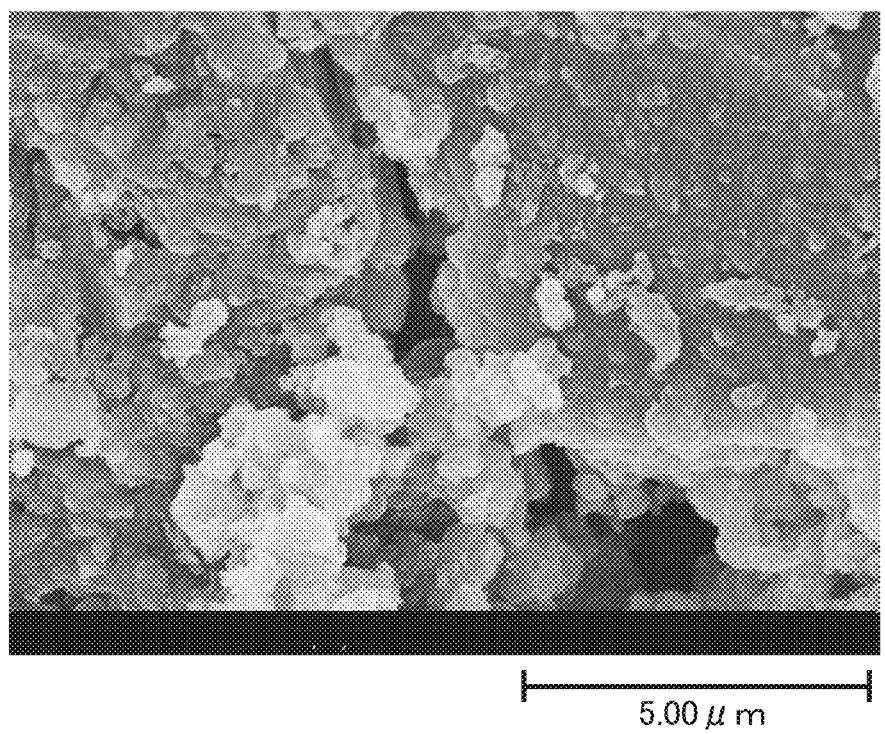
FIG. 12 is a plane SEM image of Compound E.

In the cases where the poor solvents were ethanol, propanol, butanol, and pentanol, the obtained lithium silicates (Compound A, C, D, and E, respectively) were lithium metasilicate ($Li_2SiO_3$). FIG. 11A shows a plane SEM image of Compound C, FIG. 11B shows that of Compound D, and FIG. 12 shows that of Compound E. From FIG. 8A, FIGS. 11A and 11B, and FIG. 12, it is observed that the particle size of the obtained lithium metasilicate ($Li_2SiO_3$) changes depending on the affinity of the poor solvents for water, which was used as the good solvent.

This example reveals that in the method for synthesizing alkali metal silicate, according to one embodiment of the present invention, the compositions and particle sizes of obtained alkali metal silicate change depending on the affinity of the poor solvent for alkali metal silicate to be precipitated, for a good solvent. It is thus confirmed that a good solvent and a poor solvent are preferably selected such that alkali metal silicate with a desired composition and a desired particle size is obtained.

Example 3

In this example, the case will be described where, in the method for synthesizing alkali metal silicate, according to one embodiment of the present invention, the concentration of silicon in a formed basic solution including an alkali metal salt was changed at the time of addition of silicon particles to the basic solution. Note that also in this example, lithium hydroxide was used as an alkali metal salt and water was used as a good solvent for the lithium hydroxide as in Example 1.

Specifically, the concentration of silicon in the formed lithium hydroxide aqueous solution in the step S112 was varied: 0.05 mol/l, 0.1 mol/l, 0.15 mol/l, 0.2 mol/l, 0.25 mol/l, 0.3 mol/l, and 0.5 mol/l. Lithium silicates were formed using the aqueous solutions and the specific surface areas of the lithium silicates were measured. Note that the other steps in the formation of the lithium silicates were similar to those in Example 1. The measurement of the specific surface areas was also performed in a manner similar to that in Example 1.

Figure 13:
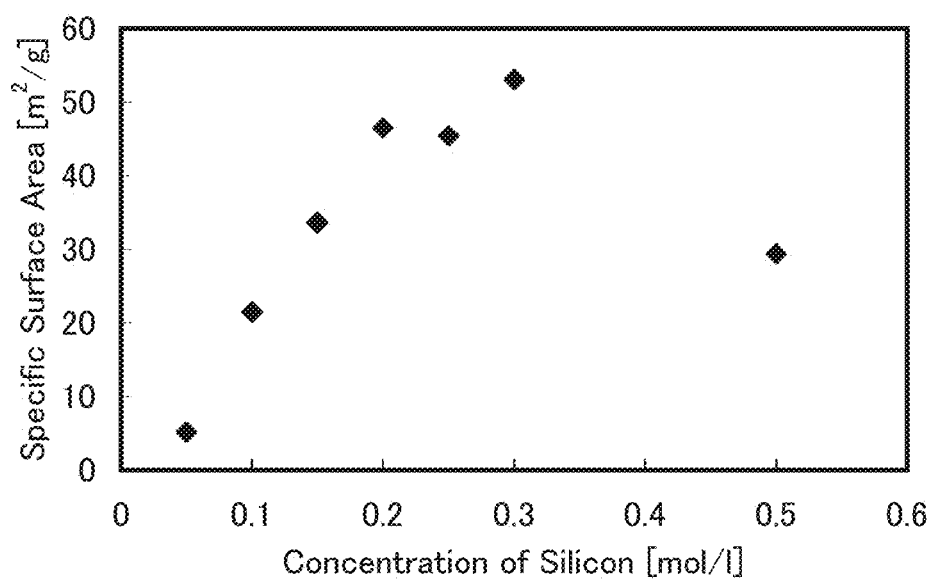
FIG. 13 shows relation between a specific surface area of lithium silicate and concentration of silicon in a formed lithium hydroxide aqueous solution.

FIG. 13 shows relations between the concentrations of silicon in the formed lithium hydroxide aqueous solutions and the specific surface areas of the obtained lithium silicates. Note that the obtained lithium silicates were all lithium metasilicate ($Li_2SiO_3$).

FIG. 13 shows that the specific surface areas of the lithium silicates which were formed with the silicon concentrations of 0.1 mol/l or higher were in a range of greater than or equal to 10 $m^2/g$ and less than or equal to 60 $m^2/g$, and that the specific surface area of the obtained lithium silicate with respect to the concentration of silicon in the formed lithium hydroxide aqueous solution has a maximum value. Note that in this example, lithium silicate which is the same as Compound A is conceivably obtained when the concentration of silicon in the lithium hydroxide aqueous solution is 0.3 mol/l; however, since the lithium silicate is in the form of powder, the measured specific area thereof varies in a certain range, not always having the same value. Thus, although the conditions under which Compound A is obtained were employed, the value of the specific surface area in this example is different.

This example reveals that in the method for synthesizing alkali metal silicate, according to one embodiment of the present invention, the concentration of silicon in a formed basic solution including an alkali metal salt is preferably adjusted such that alkali metal silicate with a desired particle size is obtained.

Example 4

In this example, lithium manganese silicate was synthesized as an example of the alkali transition metal silicate according to one embodiment of the present invention, and results of evaluation of the synthesized lithium manganese silicate will be described.

The steps S111 to S114 were performed as in Example 1, so that lithium metasilicate was synthesized.

After that, 4.0 g of manganese carbonate ($MnCO_3$) was ground by ball mill treatment. The ball mill treatment was performed in such a manner that ethanol was added as a solvent, and a ball mill with a ball diameter of 0.5 mm was rotated at 400 rpm for 2 hours.

Then, 2.20 g of the obtained lithium metasilicate and 2.80 g of the manganese carbonate were mixed by ball mill treatment, so that a mixture of the lithium metasilicate and the manganese carbonate was formed (the step S115). The ball mill treatment was performed in such a manner that acetone was added as a solvent, and a ball mill with a ball diameter of 3 mm was rotated at 400 rpm for 2 hours.

After the ball mill treatment, the mixture was taken out of the pot and heated to 50° C., so that acetone was evaporated.

Then, the second heat treatment (second baking) was performed on the mixture in the form of powder (the step S116). In this example, heating was performed at a heating temperature of 700° C. in a nitrogen atmosphere for 10 hours, so that a beige compound was obtained. Note that the compound which was obtained by the steps S111 to S116 is referred to as Compound G.

Figure 14:
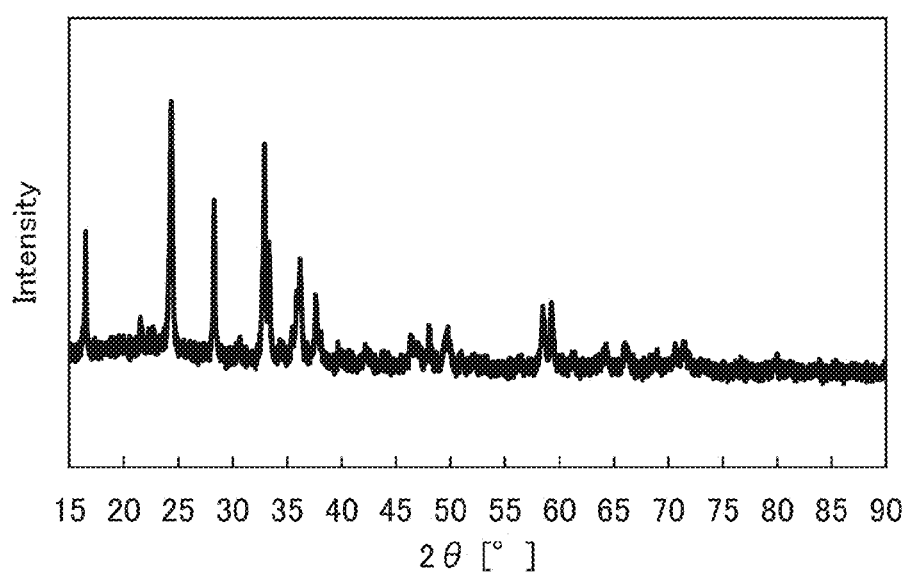
FIG. 14 is an X-ray diffraction pattern of Compound G.

To identify Compound G synthesized by the above steps, evaluation by X-ray diffraction (XRD) was carried out. A diffraction pattern of Compound G is shown in FIG. 14. The diffraction pattern reveals that Compound G is lithium manganese silicate ($Li_2MnSO_4$). Further, a peak which can be assumed to be derived from manganese oxide, a residue of an intermediate, is not observed at around $2\theta=40°$ in the diffraction pattern in FIG. 14.

In this example, by utilizing the method for synthesizing alkali transition metal silicate, according to one embodiment of the present invention, even when the heat treatment temperature which is conventionally 1000° C. or higher was set as low as 700° C., the alkali transition metal silicate (the objective substance) which does not contain a residue of an intermediate or the like or an unreacted raw material was able to be synthesized. Accordingly, in the method for synthesizing alkali transition metal silicate, according to one embodiment of the present invention, manufacturing cost can be low as compared to that in the case of employing a conventional synthesis method. Moreover, in the method for synthesizing alkali transition metal silicate, according to one embodiment of the present invention, since the objective substance can be synthesized with one heat treatment (baking), manufacturing time can be short as compared to that in the case of employing a conventional synthesis method.

REFERENCE NUMERALS

S111: step, S112: step, S113: step, S114: step, S115: step, S116: step, 100: lithium secondary battery, 101: positive electrode current collector, 102: positive electrode active material layer, 103: positive electrode, 104: negative electrode current collector, 105: negative electrode active material layer, 106: negative electrode, 107: electrolyte, 108: separator, 109: external terminal, 111: external terminal, 121: gasket, 201a: common portion, 201b: region, 202: core, 204: outer shell, 5000: display device, 5001: housing, 5002: display portion, 5003: speaker portion, 5004: power storage device, 5100: lighting device, 5101: housing, 5102: light source, 5103: power storage device, 5104: ceiling, 5105: wall, 5106: floor, 5107: window, 5200: indoor unit, 5201: housing, 5202: an air outlet, 5203: power storage device, 5204: outdoor unit, 5300: electric refrigerator-freezer, 5301: housing, 5302: door for refrigerator, 5303: door for freezer, 5304: power storage device, 9630: housing, 9631: display portion, 9631a: display portion, 9631b: display portion, 9632a: touch panel region, 9632b: touch panel region, 9033: fastener, 9034: switch for switching display mode, 9035: power switch, 9036: switch for switching to power-saving mode, 9038: operation switch, 9639: button for switching to keyboard display, 9633: solar battery, 9634: charge/discharge control circuit, 9635: battery, 9636: DC to DC converter, 9637: converter, 9638: operation key, 9650: switch, 9652: switch, and 9654: switch.

This application is based on Japanese Patent Application serial no. 2011-190670 filed with Japan Patent Office on Sep. 1, 2011 and Japanese Patent Application serial no. 2011-190678 filed with Japan Patent Office on Sep. 1, 2011, the entire contents of which are hereby incorporated by reference.

The invention claimed is:

1. A method for synthesizing a silicate microparticle, comprising the steps of:
    adding dropwise of a first solution including alkali metal silicate to a second solution to precipitate the alkali metal silicate under stirring the second solution or under application of ultrasonic waves to the second solution,
    wherein a solubility of the alkali metal silicate of the second solution is lower than a solubility of the alkali metal silicate of the first solution,
    wherein a silicon atoms molar concentration of the first solution is higher than or equal to 0.1 mol/l and lower than or equal to 0.5 mol/l,
    wherein a rate at which the dropwise of the first solution is added to the second solution is higher than or equal to 40 ml/h and lower than or equal to 80 ml/h, and
    wherein a solvent of the second solution has affinity for a solvent of the first solution.

2. The method for synthesizing the silicate microparticle, according to claim 1, further comprising the steps of:
    collecting the precipitated alkali metal silicate; and
    performing heat treatment on the collected alkali metal silicate.

3. The method for synthesizing the silicate microparticle, according to claim 1, wherein the first solution including the alkali metal silicate is formed by dissolving silicon into a solution including an alkali metal salt of pH of 9 or more.

4. The method for synthesizing the silicate microparticle, according to claim 3, wherein the first solution including the alkali metal salt is kept at a temperature of higher than or equal to 50° C. and lower than or equal to 70° C.

5. The method for synthesizing the silicate microparticle, according to claim 3, wherein the first solution including the alkali metal salt is an alkali metal hydroxide aqueous solution.

6. The method for synthesizing the silicate microparticle, according to claim 1, wherein the solvent of the second solution is ethanol.

7. The method for synthesizing the silicate microparticle, according to of claim 1, wherein the alkali metal is lithium.

8. The method for synthesizing the silicate microparticle, according to claim 1, further comprising the steps of:

mixing the precipitated alkali metal silicate with a microparticulated compound including a transition metal to form a mixture; and performing heat treatment on the mixture to generate alkali transition metal silicate.

9. The method for synthesizing the silicate microparticle, according to claim 2, further comprising the steps of:

mixing the alkali metal silicate subjected to the heat treatment with a microparticulated compound including a transition metal to form a mixture; and performing second heat treatment on the mixture to generate alkali transition metal silicate.

10. The method for synthesizing the silicate microparticle, according to claim 8, wherein the transition metal is manganese.

11. The method for synthesizing the silicate microparticle, according to claim 8, wherein the microparticulated compound including the transition metal is a carbonate.

12. The method for synthesizing the silicate microparticle, according to claim 9, wherein the transition metal is manganese.

13. The method for synthesizing the silicate microparticle, according to claim 9, wherein the microparticulated compound including the transition metal is a carbonate.

14. The method for synthesizing the silicate microparticle, according to claim 8, wherein the heat treatment performed on the mixture is performed under an inert gas atmosphere at a temperature of higher than or equal to 700° C. and lower than or equal to 1000° C.

15. The method for synthesizing the silicate microparticle, according to claim 9, wherein the second heat treatment performed on the mixture is performed under an inert gas atmosphere at a temperature of higher than or equal to 700° C. and lower than or equal to 1000° C.

16. The method for synthesizing the silicate microparticle, according to claim 8, wherein a specific surface area of the generated alkali transition metal silicate, measured by gas adsorption, is greater than or equal to 50 $m^2/g$ and less than or equal to 150 $m^2/g$.

17. A method for manufacturing an electrode, comprising the steps of:

adding dropwise of a first solution including alkali metal silicate to a second solution to precipitate the alkali metal silicate under stirring the second solution or under application of ultrasonic waves to the second solution, mixing the precipitated alkali metal silicate with a microparticulated compound including a transition metal to form a mixture;

performing heat treatment on the mixture to generate alkali transition metal silicate;

making a slurry by mixing the alkali transition metal silicate, a binder, and a conductive auxiliary agent;

putting the slurry on a current collector; and drying the slurry on the current collector, wherein a solubility of the alkali metal silicate of the second solution is lower than a solubility of alkali metal silicate of the first solution, wherein a silicon atoms molar concentration of the first solution is higher than or equal to 0.1 mol/l and lower than or equal to 0.5 mol/l, wherein a rate at which the dropwise of the first solution is added to the second solution is higher than or equal to 40 ml/h and lower than or equal to 80 ml/h, and wherein a solvent of the second solution has affinity for a solvent of the first solution.

18. The method for synthesizing the silicate, according to claim 17, further comprising the steps of:

collecting the precipitated alkali metal silicate; and performing heat treatment on the collected alkali metal silicate.

19. The method for synthesizing the silicate, according to claim 17, wherein the first solution including the alkali metal silicate is formed by dissolving silicon into a solution including an alkali metal salt of pH of 9 or more.

20. The method for synthesizing the silicate, according to claim 19, wherein the first solution including the alkali metal salt is kept at a temperature of higher than or equal to 50° C. and lower than or equal to 70° C.

21. The method for synthesizing the silicate, according to claim 19, wherein the first solution including the alkali metal salt is an alkali metal hydroxide aqueous solution.

22. The method for synthesizing the silicate, according to claim 17, wherein the second solution is ethanol.

23. The method for synthesizing the silicate, according to of claim 17, wherein the alkali metal is lithium.

24. The method for synthesizing the silicate, according to claim 17, wherein the transition metal is manganese.

25. The method for synthesizing the silicate, according to claim 17, wherein the microparticulated compound including the transition metal is a carbonate.

26. The method for synthesizing the silicate, according to claim 17, wherein the heat treatment performed on the mixture is performed under an inert gas atmosphere at a temperature of higher than or equal to 700° C. and lower than or equal to 1000° C.

27. The method for synthesizing the silicate, according to claim 17, wherein a specific surface area of the generated alkali transition metal silicate, measured by gas adsorption, is greater than or equal to 50 $m^2/g$ and less than or equal to 150 $m^2/g$.

* * * * *